US006950608B2

(12) United States Patent
Szajewski et al.

(10) Patent No.: US 6,950,608 B2
(45) Date of Patent: Sep. 27, 2005

(54) CAPTURE OF MULTIPLE INTERLACED IMAGES ON A SINGLE FILM FRAME USING MICRO-LENSES AND METHOD OF PROVIDING MULTIPLE IMAGES TO CUSTOMERS

(75) Inventors: Richard P. Szajewski, Rochester, NY (US); Lyn M. Irving, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 45 days.

(21) Appl. No.: 10/745,193

(22) Filed: Dec. 23, 2003

(65) Prior Publication Data

US 2005/0135798 A1 Jun. 23, 2005

(51) Int. Cl.[7] .............................................. G03B 41/00
(52) U.S. Cl. ...................................... 396/335; 396/338
(58) Field of Search ................................. 396/335–340

(56) References Cited

U.S. PATENT DOCUMENTS

| 992,151 | A | 5/1911 | Berthon |
| 1,746,584 | A | 2/1930 | Fournier |
| 1,749,278 | A | 3/1930 | Frederick |
| 1,824,353 | A | 9/1931 | Jensen |
| 1,838,173 | A | 12/1931 | Chretien |
| 1,849,036 | A | 3/1932 | Ernst |
| 1,942,841 | A | 1/1934 | Shimizu |
| 1,985,731 | A | 12/1934 | Ives |
| 2,143,762 | A | 1/1939 | Carstaff |
| 2,144,649 | A | 1/1939 | Eggart et al. |
| 2,191,038 | A | 2/1940 | Capstaff |
| 2,252,006 | A | 8/1941 | Holst et al. |
| 2,304,988 | A | 12/1942 | Yule |
| 2,316,644 | A | 4/1943 | Yule |

(Continued)

FOREIGN PATENT DOCUMENTS

| EP | 0 961 482 A2 | 12/1999 |
| EP | 0 961 483 A2 | 12/1999 |
| EP | 0 961 484 A2 | 12/1999 |
| EP | 0 961 485 A2 | 12/1999 |
| EP | 0 961 486 A2 | 12/1999 |
| JP | 2001-147466 | 5/2001 |
| WO | WO 98/31142 | 7/1998 |
| WO | WO 98/34397 | 8/1998 |
| WO | WO 99/40729 | 8/1999 |
| WO | WO 99/42954 | 8/1999 |

OTHER PUBLICATIONS

Edward M. Crane and C. H. Evans, "Devices for Making Sensitometric Exposures on Embossed Kinescope Recording Film" Jan. 1958, pps. 13–16, Journals of the SMPTE vol. 67.

J.S. Courtney–Pratt, "Lenticular Plate Multiple Picture Shadowgraph Recording", Sep. 1961, pps. 710–715, Journal of the SMPTE, vol. 70.

C.H.Evans and R.B. Smith, "Color Kinescope Recording on Embossed Film" Jul., 1956, pps. 365–372, Journal of the SMPTE, vol. 65.

Rudolf Kingslake, "The Optics of the Lenticular Color–Film Process", Jan. 1958, pps. 8–13, Journal of the SMPTE, vol. 67.

Furukawa, et al., "A 1/3–inch 380K Pixel (Effective) IT–CCD Image Sensor", Jun. 5, 1992, pps. 595–600, IEEE, vol. 38, No. 3.

Deguchi et al., "Microlens Design Using Simulation Program For CCD Image Sensor", Jun. 5, 1992, pps. 583–589, IEEE, vol. 38, No. 3, Aug. 1992.

*Primary Examiner*—David M. Gray
(74) *Attorney, Agent, or Firm*—Roland R. Schindler, II

(57) ABSTRACT

Cameras and methods are provided for recording more than one image on a photosensitive element. The cameras and methods record the images in the form of separate patterns of concentrated image elements. Apparatuses and methods are provided for recovering images from the concentrated image elements.

36 Claims, 22 Drawing Sheets

U.S. PATENT DOCUMENTS

| | | |
|---|---|---|
| 2,407,211 A | 9/1946 | Yule |
| 2,455,849 A | 12/1948 | Yule |
| 2,691,586 A | 10/1954 | Yule et al. |
| 2,992,103 A | 7/1961 | Land et al. |
| 3,413,117 A | 11/1968 | Gaynor |
| 3,506,350 A | 4/1970 | Denner |
| 3,905,701 A | 9/1975 | David |
| 3,954,334 A | 5/1976 | Bestenreiner et al. |
| 3,973,953 A | 8/1976 | Montgomery |
| 3,973,954 A | 8/1976 | Bean |
| 3,973,957 A | 8/1976 | Montgomery |
| 3,973,958 A | 8/1976 | Bean |
| 4,040,830 A | 8/1977 | Rogers |
| 4,272,186 A | 6/1981 | Plummer |
| 4,458,002 A | 7/1984 | Janssens et al. |
| 4,483,916 A | 11/1984 | Thiers |
| 4,941,039 A | 7/1990 | E'Errico |
| 5,134,573 A | 7/1992 | Goodwin |
| 5,266,805 A | 11/1993 | Edgar |
| 5,267,030 A | 11/1993 | Giorgianni et al. |
| 5,279,123 A | 1/1994 | Wechsler et al. |
| 5,459,544 A | 10/1995 | Emura |
| 5,464,128 A | 11/1995 | Keller |
| 5,466,255 A | 11/1995 | Franchi |
| 5,519,510 A | 5/1996 | Edgar |
| 5,528,339 A | 6/1996 | Buhr et al. |
| 5,649,250 A | 7/1997 | Sasaki |
| 5,694,484 A | 12/1997 | Cottrell et al. |
| 5,744,291 A | 4/1998 | Ip |
| 5,790,277 A | 8/1998 | Edgar |
| 5,835,627 A | 11/1998 | Higgins et al. |
| 5,962,205 A | 10/1999 | Arakawa et al. |
| 5,988,896 A | 11/1999 | Edgar |
| 6,222,607 B1 | 4/2001 | Szajewski et al. |
| 6,242,841 B1 | 6/2001 | Williams |
| 6,271,940 B1 | 8/2001 | Deschuytere et al. |

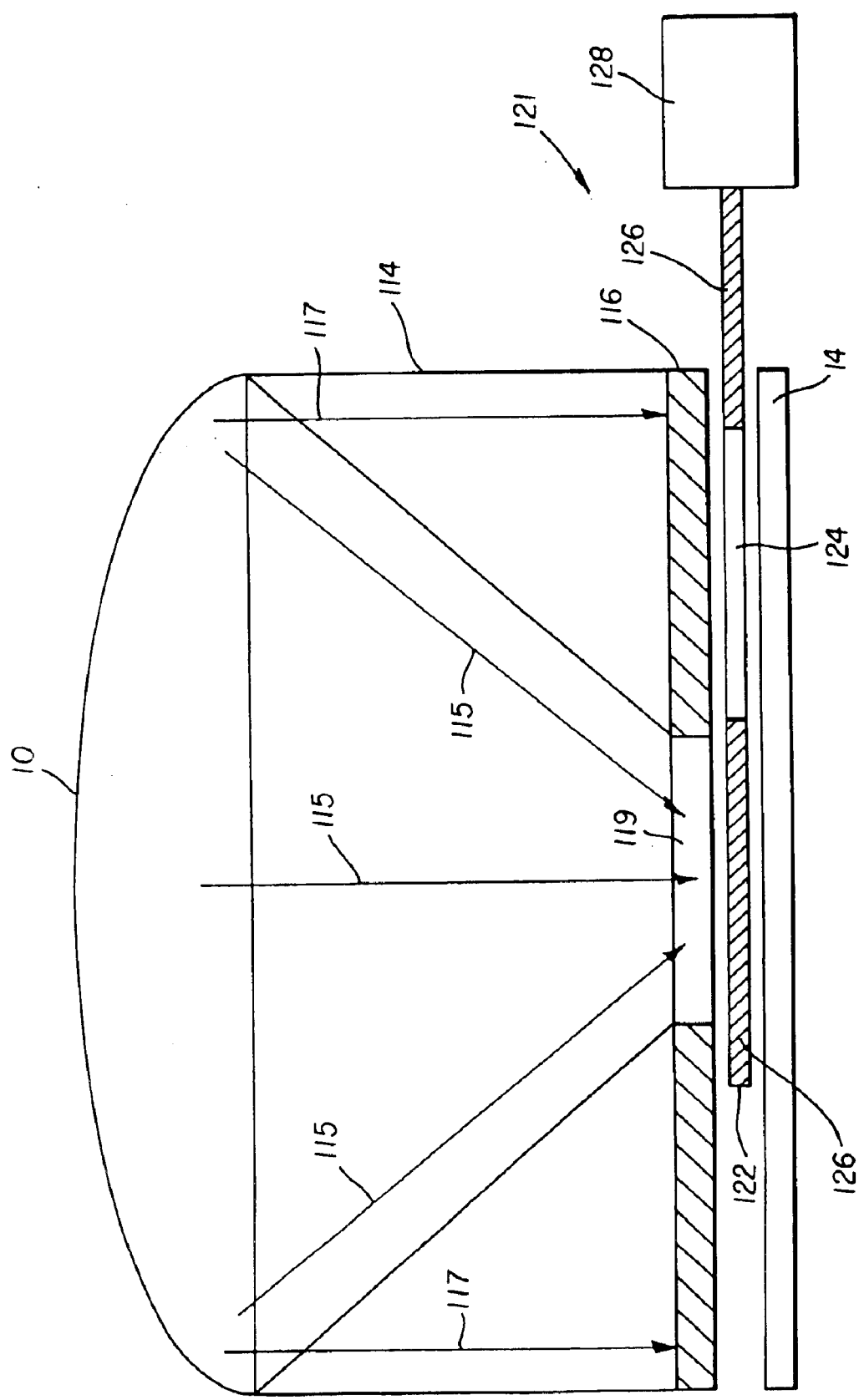

CAPTURE OF MULTIPLE INTERLACED IMAGES ON A SINGLE FILM FRAME USING MICRO-LENSES AND METHOD OF PROVIDING MULTIPLE IMAGES TO CUSTOMERS

CROSS REFERENCE TO RELATED APPLICATIONS

This application is related to a group of seven previously co-filed and commonly assigned U.S. Patent Applications, namely U.S. patent application Ser. No. 10/170,607, entitled CAMERA SPEED COLOR FILM WITH BASE SIDE MICRO-LENSES; in the names of Lyn Irving and Richard Szajewski; U.S. patent application Ser. No. 10/711,012, entitled LENTICULAR IMAGING WITH INCORPORATED BEADS, in the names of Krishnan Chari, Lyn Irving and Richard Szajewski; U.S. patent application Ser. No. 10/167,746, entitled CAMERA SPEED COLOR FILM WITH EMULSION SIDE MICRO-LENSES, in the names of Richard Szajewski and Lyn Irving; U.S. patent application Ser. No. 10/167,794, entitled IMAGING USING SILVER HALIDE FILMS WITH MICRO-LENS CAPTURE, AND OPTICAL RECONSTRUCTION in the names of Lyn Irving and Richard Szajewski; U.S. patent application Ser. No. 10/170,148, entitled IMAGING USING SILVER HALIDE FILMS WITH MICRO-LENS CAPTURE, SCANNING AND DIGITAL RECONSTRUCTION in the names of Richard Szajewski and Lyn Irving; U.S. patent application Ser. No. 10/281,645, entitled IMAGING USING SILVER HALIDE FILMS WITH INVERSE MOUNTED MICRO-LENS AND SPACER in the names of Richard Szajewski and Lyn Irving; U.S. patent application Ser. No. 10/326,455 entitled IMAGING SYSTEM HAVING EXTENDED USEFUL LATITUDE in the names of Richard Szajewski and Lyn Irving; and U.S. patent application Ser. No. 10/649,464 entitled PHOTOGRAPHIC FILM CARTRIDGE OR CASSETTE SYSTEMS WITH MICROLENS in the names of Richard Szajewski and Lyn Irving, the contents of which are incorporated herein by reference.

FIELD OF THE INVENTION

This invention relates to the field of photography and, in particular, to cameras that capture more than one image on a single photosensitive element.

BACKGROUND OF THE INVENTION

There has been a long felt need for compact cameras that can be used to capture several images on a single sheet of film stock. Of particular interest are inexpensive compact cameras of this type that can provide high-quality images. Such cameras are especially desired as one-time-use cameras and simple rental cameras.

Apparatuses that allow the capture of multiple images on a single sheet of light sensitive silver halide film have been known for some time. In one example of this type, multiple small lenses and a complex sequential shutter mechanism enable the capture of multiple sequential images of an ongoing activity to form the so-called "golf" stop-action camera as described by U.S. Pat. No. 5,649,250. In such a stop-action camera, each of the sequential images occupies only a small portion of an otherwise standard film frame. In a commercial example of a camera of the type that is described in the '250 patent, eight distinct images are captured per 135-format film frame instead of one image as in a standard camera. The image resolution recorded per scene by such cameras is greatly reduced. There are many reasons for this. First, all but the most expensive lens systems are less than perfect at faithfully transmitting fine detail because of the inherent fall-off in high frequency response that can be caused by deviations in the design, manufacture or arrangement of such systems. However, lens systems that are used to capture images on only a portion of a film stock are particularly vulnerable to such deviations precisely because they are required to faithfully transmit high spatial frequency information, and even minor deviations can significantly compromise the ability of the image capture system to capture images having fine detail. Further, some type of film stock can exhibit less than perfect recording of fine detail because of the intrinsic fall-off in high frequency response inherent in camera speed films due to the particulate nature of the silver halide grains.

High frequency information necessary for good sharpness in an image can also be lost when a smaller image frame is later enlarged to provide a final viewable image. The necessity for this greater degree of enlargement is inherent in employing only a partial frame to record an image. In the camera described in the '250 patent, image capture and reproduction involves an extra 8× reduction followed by an extra 8× enlargement relative to a standard 135-format frame with concomitant resolution losses at both steps.

Thus, what is needed is a camera that allows multiple images to be recorded on a single frame of film stock without causing unacceptable losses in the appearance of fine detail in the captured image.

SUMMARY OF THE INVENTION

In one aspect of the invention a camera is provided for recording more than one image on a photosensitive element. The camera has a primary lens system focusing light from a scene at an imaging plane, a gate positioning a photosensitive element, an array of micro-lenses arranged at the imaging plane and focusing light received from the primary lens system to form a pattern of concentrated image elements on the photosensitive element positioned at the gate and a shutter assembly adapted to controllably allow light to flow from the scene to the array of micro-lenses for a period of time defining an exposure. A translation drive is adapted to adjust the position of at least one of the primary lens system, the array of micro-lenses, and the gate so that the micro-lenses focus light received during different exposures onto different portions of the photosensitive element. Wherein the concentrated image elements formed during different exposures are at least in part recorded in an interspersed manner on the photosensitive element.

In another aspect of the invention, a camera is provided for recording more than one image on a photosensitive element. The camera has a primary lens system focusing light from a scene at an imaging plane, said primary lens system defining an aperture, a gate positioning the photosensitive element, an array of micro-lenses arranged at the imaging plane and focusing light received from the primary lens system to form a pattern of concentrated image elements on the photosensitive element positioned by the gate and a shutter assembly adapted to move between a first position that blocks light from flowing from the scene to the array of micro-lenses and a second position that permits light to flow, with movement between the first position and second position defining an exposure. A translation drive is adapted to adjust the position of at least one of the aperture, the array of micro-lenses, and the photosensitive element so that the micro-lenses focus light received from the primary lens system during different exposures onto different portions of the photosensitive element that have not previously been exposed to concentrated light. Wherein each pattern of concentrated image elements formed during different exposures is distributed across substantially all of an image recording area provided by the photosensitive element.

In still another aspect of the invention a camera is provided. The camera has a lens unit for focusing light from a scene onto an imaging plane, a light modulating means for concentrating the light focused by the lens means to form a pattern of concentrated light elements on the photosensitive element, an exposure control means for controllably allowing light to pass from the scene to the photosensitive element for a period of time to define an exposure. An adjustment means for causing the concentrated image elements of each exposure to be recorded on different portions of an image receiving area of the photosensitive element.

In yet another aspect of the invention, a method is provided for capturing at least two images on a photosensitive element. In accordance with the method a photosensitive element is exposed to light from a scene, the light from the scene exposure is focused onto an imaging plane and the focused light is concentrated to form a pattern of concentrated image elements on the photosensitive element during the exposure. The photosensitive element is subsequently exposed to light from a distinct scene and the light from the subsequent distinct scene exposure is focused onto an imaging plane. The focused light from the subsequent distinct scene exposure is concentrated to form a different pattern of concentrated image elements on a different portion of the photosensitive element. Wherein the patterns of concentrated image elements formed during each exposure are at least in part interspersed.

In another aspect of the invention, a reader apparatus is provided for forming an output image using a photoprocessed element having at least two patterns of concentrated image elements. The reader apparatus has a light source radiating light, a gate positioning the photoprocessed element to modulate light radiated by the light source and a micro-lens array adapted to decompress light modulated by predetermined patterns of concentrated image element areas on the photoprocessed element, said predetermined pattern differing from the pattern actually formed on the photoprocessed element. A lens unit receives the decompressed light and forms an output image at an imaging plane. A field lens is positioned between the array of micro-lenses and the lens unit, with the field lens adapting the decompressed light so that the output image contains an image that is based upon one of the patterns of concentrated image elements actually formed on the photoprocessed element. A positioning system for adjusting the relative position at least one of the micro-lens array, lens unit, field lens or gate so that the micro-lens array can decompress light modulated by a selected one of the pattern of concentrated image elements recorded on the photoprocessed element.

In still another aspect of the invention a method is provided for forming an output image from a photoprocessed element having an image area with at least two images recorded thereon in the form of concentrated image elements. In accordance with the method, the photoprocessed element is scanned to obtain image data from at least one pattern concentrated image element and the image data obtained from concentrated image elements associated with a selected one of the patterns from image data associated with other patterns. Forming an output image based upon image data from the image data associated with the selected one of the patterns.

BRIEF DESCRIPTION OF THE DRAWINGS

FIG. 10b illustrates a side view of the array of FIG. 10a;

FIG. 11b illustrates a face view of the aperture stop system of FIG. 11a;

FIG. 14a illustrates the use of a shutter system in conjunction with a light blocking structure, micro-lens array and photosensitive element with the shutter system in a light blocking position;

DETAILED DESCRIPTION OF THE INVENTION

The camera and image capture method of the invention provides a simple and inexpensive apparatus and method for capturing multiple distinct images using a single instance of film stock. The camera is especially suited to being configured as a one-time use camera and advantageous for use in rental situations.

Figure 1:
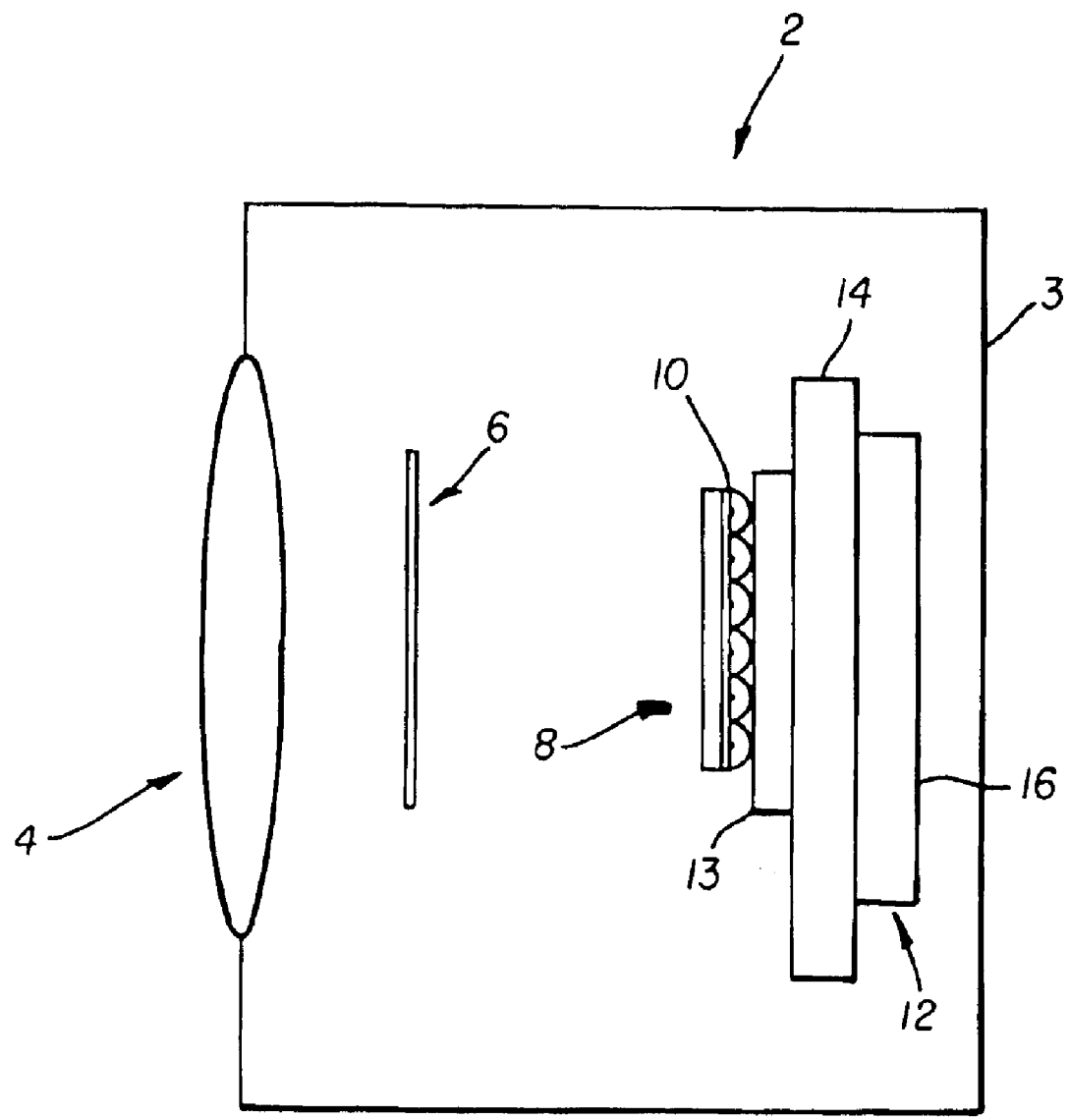
FIG. 1 schematically illustrates a side view of one embodiment of a camera of the invention having a primary lens, a micro-lens array and a loaded film.

FIG. 1 schematically illustrates a side view of one embodiment of a camera to of the present invention. In the embodiment of FIG. 1, camera 2 has a light tight body 3, a primary lens system 4 for forming an exposure aperture and focusing light from a scene at an imaging plane and a shutter assembly 6 that controllably allows light to pass from primary lens system 4 to the imaging plane. An array 8 of micro-lenses 10 is positioned at the imaging plane. Each micro-lens 10 in array 8 further focuses a portion of the light from the primary lens system 4. A gate system 12 positions photosensitive element 14 to receive the light focused by micro-lenses 10. In the embodiment shown in FIG. 1, gate system 12 positions photosensitive element 14 at a predetermined distance from micro-lenses 10. In the embodiment shown, gate system 12 comprises an optional spacer 13 that defines a minimum separation between micro-lenses 10 and photosensitive element 14 and a pressure plate 16 that defines a maximum separation between micro-lenses 10 and photosensitive element 14. By use of the spacer 13 and pressure plate 16, the positioning and orientation of photosensitive element 14 can be closely controlled. However, other conventional gate systems 12 can be used to position photosensitive element 14 in relation to micro-lenses 10.

Figure 2A:
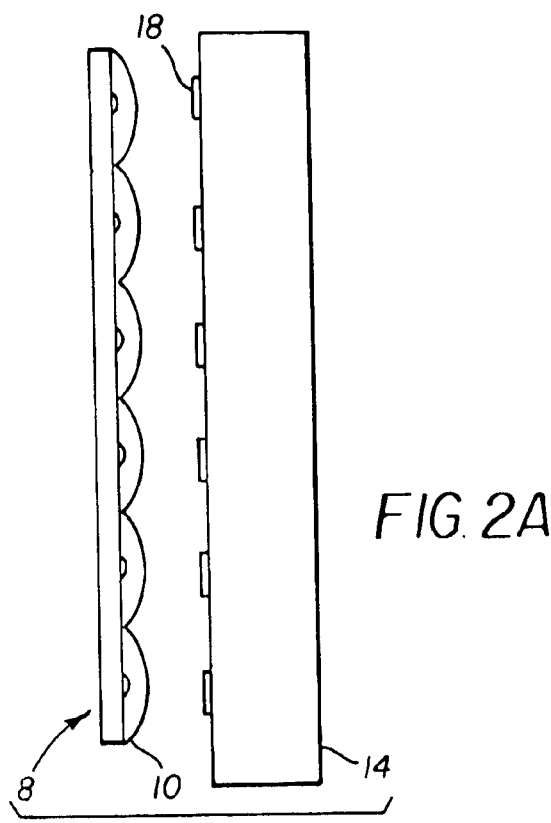
FIG. 2A further illustrates a side view of the micro-lens array, and the relationship of the micro-lens array to exposed areas of a photosensitive element.
Figure 2B:
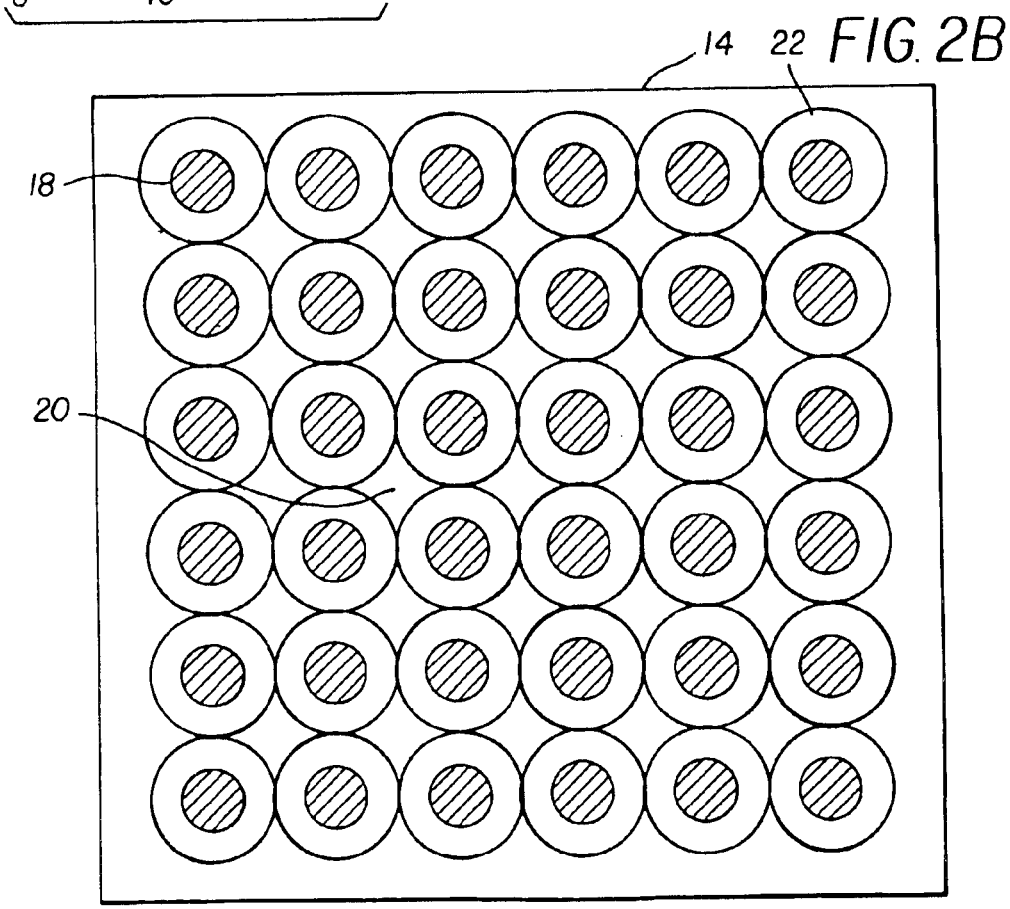
FIG. 2B schematically illustrates a face view of the micro-lens array and photosensitive element of FIG. 2A highlighting the light collecting areas of the micro-lens array and the exposed areas of the photosensitive element.

The principles and operation of camera 2 of the embodiment of FIG. 1 will now be described in greater detail. FIG. 2A illustrates a side view of an array 8 of micro-lenses 10 and photosensitive element 14. On operation of shutter assembly 6, light passes from primary lens system 4 through micro-lenses 10 and is focused at concentrated exposure areas 18 of photosensitive element 14. FIG. 2B shows a face view of projections 22 of individual micro-lenses 10 of array 8 on photosensitive element 14 of FIG. 2A. Each projection 22 corresponds to a light receiving surface 11 of a micro-lens 10. Light from primary lens system 4 enters each micro-lens 10 at light receiving surface 11 and is focused by micro-lens 10 to form a concentrated image element on photosensitive element 14. By focusing the light in this manner, the effective sensitivity of camera 2 is greater than the sensitivity of a conventional camera that does not have array 8 of micro-lenses 10. Because of this increased effective sensitivity, camera 2 can be used with photosensitive elements that have slower acting emulsion yet, can still capture images over a range of exposure conditions that is consistent with the image capture capabilities of conventional cameras and conventional photosensitive elements 14 having high speed emulsions. This is particularly advantageous in a photosensitive element 14 having a relatively low speed emulsion is typically less expensive than a photosensitive element 14 having higher speed emulsions and is also better capable of capturing fine detail in images.

Further, capturing images in this manner does not require the use of a primary lens system 4 that is adapted for capturing small images. Accordingly, primary lens system 4 can be of a conventional type that is adapted to capture an image using an entire portion of photosensitive element 14 and that is not as particularly vulnerable to minor deviations in design, manufacture or location as is a lens of the type that captures a small sized latent image.

Figure 3:
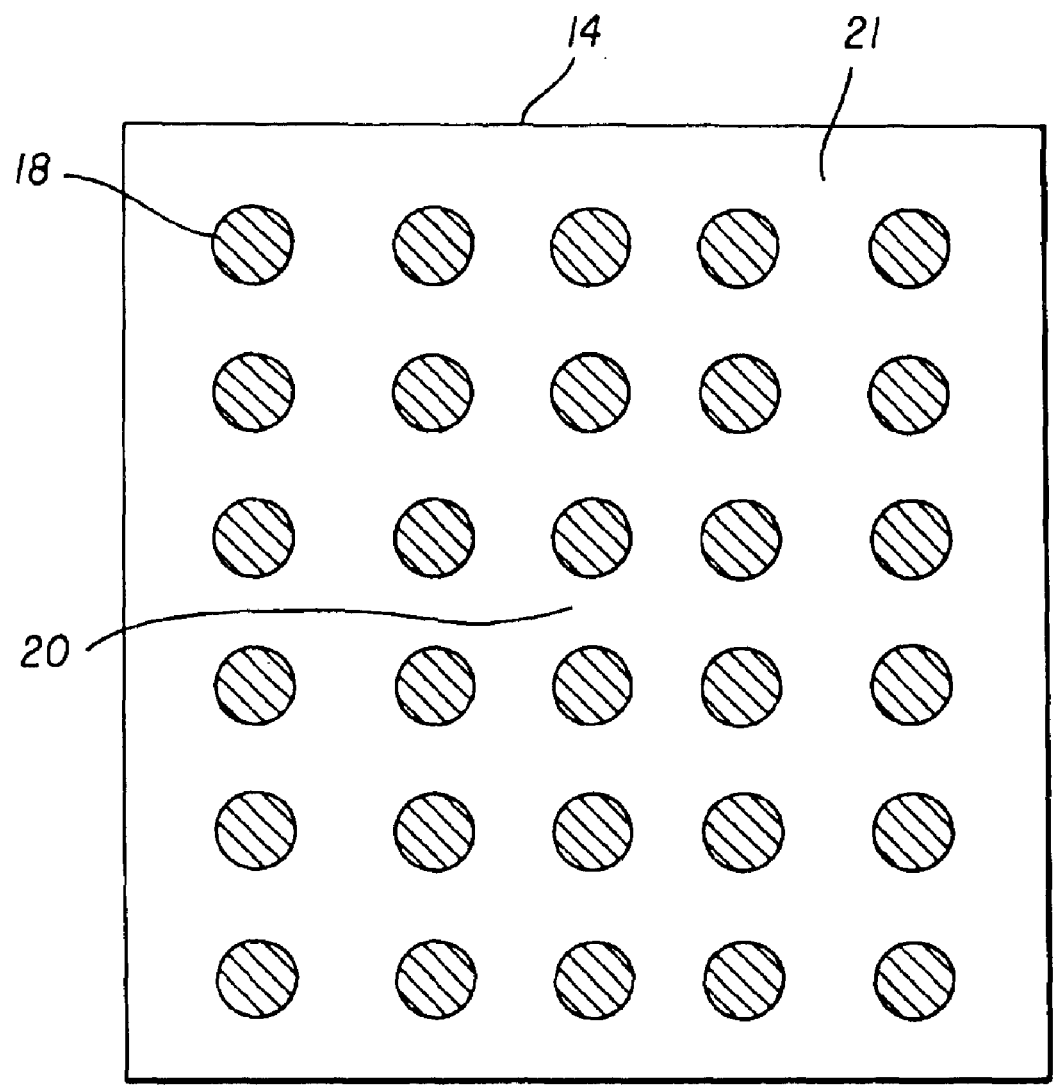
FIG. 3 further illustrates the detail of FIG. 2B showing areas of exposed photosensitive element.

As is shown in FIG. 2B, the exposure areas 18 of photosensitive element 14 are smaller than the projections 22 of light receiving surfaces 11 of micro-lenses 10. Accordingly, substantial portions of photosensitive element 14 remain as unexposed areas 20 after exposure areas 18 are formed on photosensitive element 14 during an image capture process. FIG. 3 illustrates photosensitive element 14 of FIG. 2A after a first exposure showing an illustrative pattern of exposure areas 18 recorded in an image recording area 19 of photosensitive element 14 and unexposed areas 20 between the concentrated exposure areas 18.

It will be appreciated that, unexposed areas 20 are available for image recording. However, to accomplish this, an adjustment must be made so that subsequent recorded exposure areas (not shown) can be formed on photosensitive element 14 within the unexposed areas 20. In one embodiment, the relative position of the micro-lenses 10 of array 8 can be translated relative to photosensitive element 14 to achieve this result.

Figure 4A:
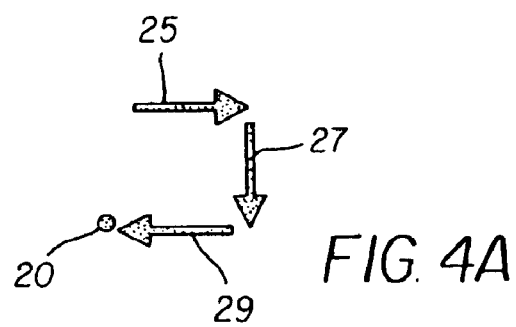
FIG. 4A schematically illustrates a series of planar translations applied to the micro-lens array of FIG. 2A relative to the film of FIG. 2A.
Figure 4B:
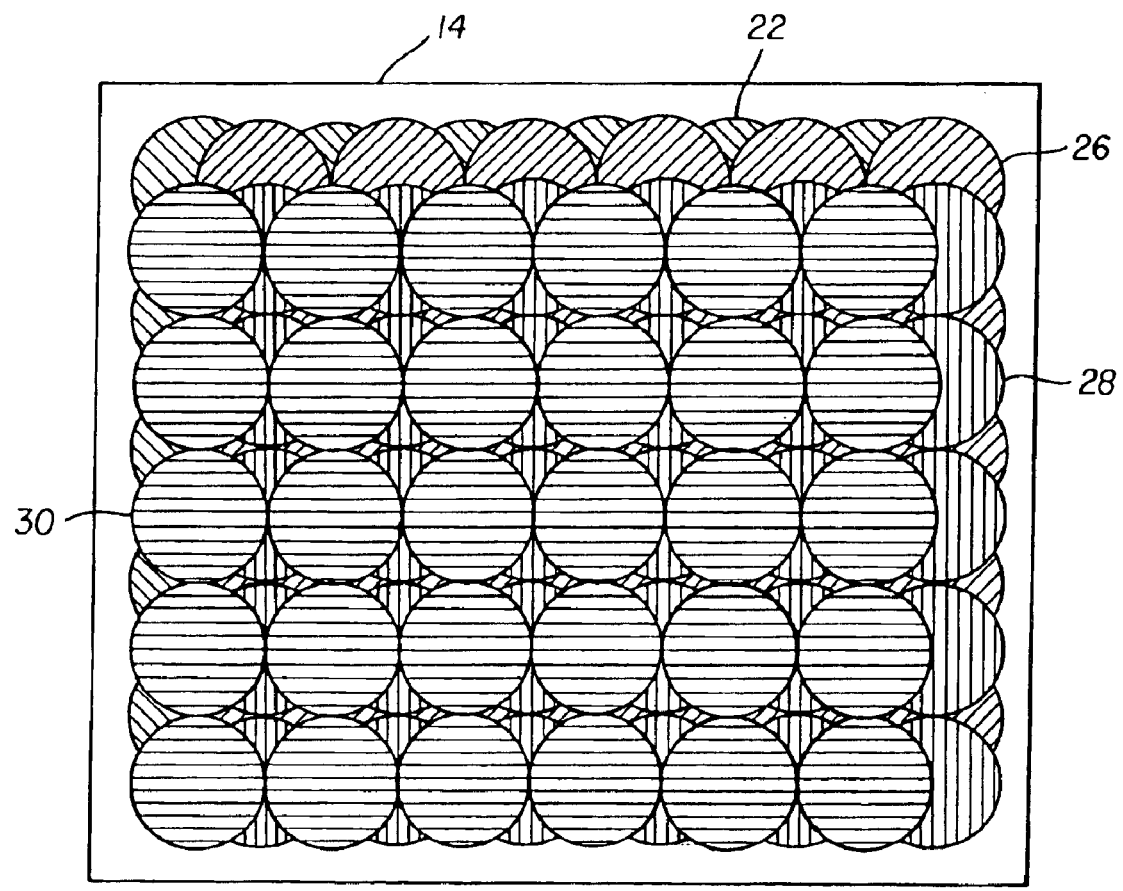
FIG. 4B illustrates a face view of the light collecting areas of the micro-lens array at various stages of translation shown in FIG. 4A.
Figure 5:
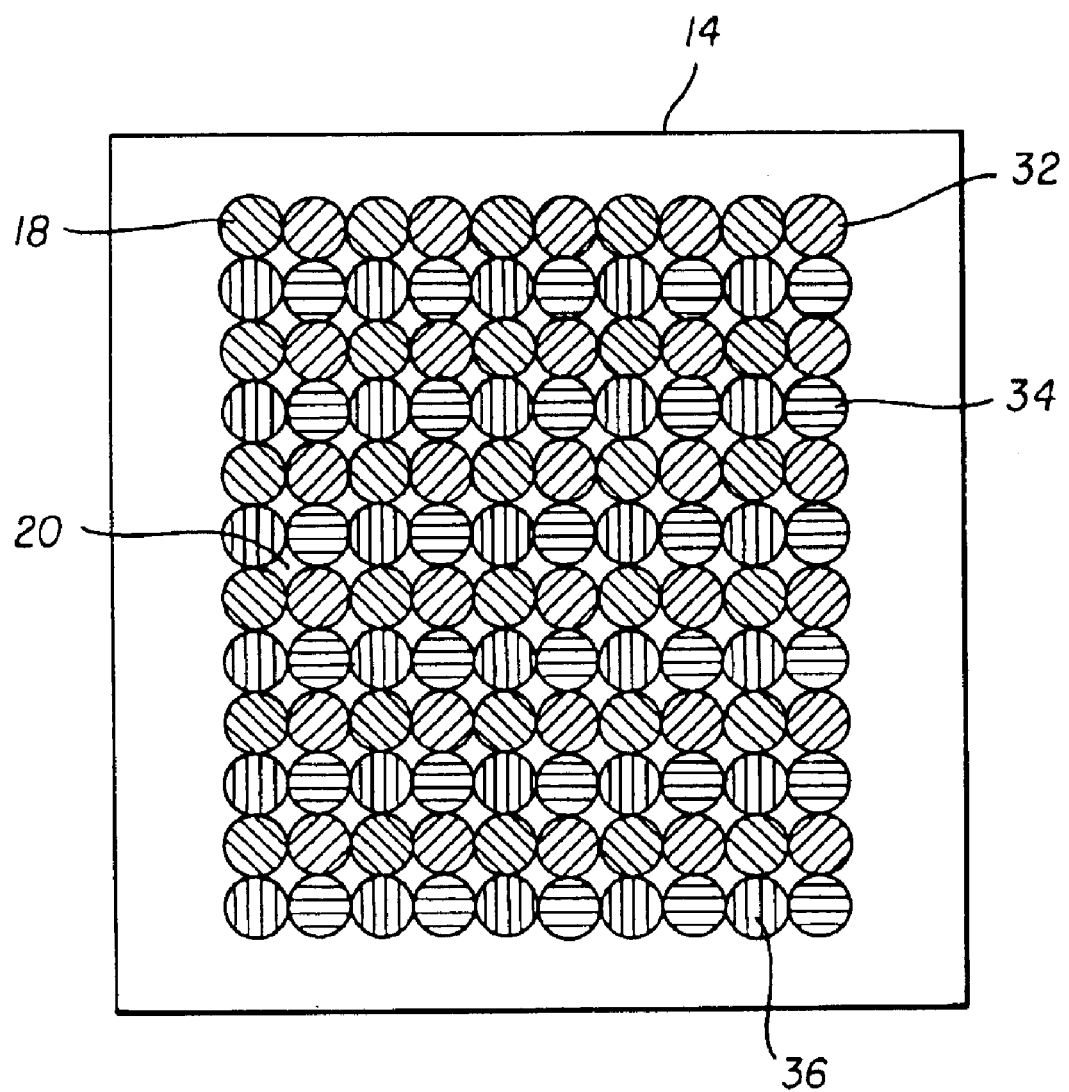
FIG. 5 illustrates the exposed areas of the photosensitive element at various stages of translation shown in FIG. 4A.

FIGS. 4A, 4B and 5 illustrate this use of array 8 of micro-lenses 10 shown in FIGS. 2A and 2B. In the embodiment of FIGS. 2A and 2B micro-lenses 10 of array 8 are arranged in a square pattern. Accordingly, three translations are possible in the image recording area 19. Each translation, for example, being one half of the pitch or diameter of each micro-lens 10. Such translations serve to interlace the projected areas of the micro-lens 10 relative to photosensitive element 14.

FIG. 4A shows a translation diagram of the relative movements of a sequence translation movements shown as rays 25, 27, and 29. FIG. 4B shows projected areas 22 of light receiving surfaces 11 of micro-lenses 10 before translation, projected areas 26 after translation 25, projected areas 28 after translation 27, and projected areas 30 after translation 29. Because the projected exposure areas are smaller than the projected areas of the light receiving surface 11 of micro-lenses 10, an interlaced series of exposures is sequentially formed on photosensitive element 14. These exposure areas are shown in FIG. 5. As shown in FIG. 5, concentrated image elements 18 are formed during an exposure that occurs before translation, exposure areas 32 that are formed on photosensitive element 14 when an exposure occurs after translation 25, concentrated image elements 34 that are formed on photosensitive element 14 when an exposure occurs after translation 27 and 36 that are formed on photosensitive element 14 when an exposure occurs after translation 29. In this way, four patterns of concentrated image elements can be recorded in image recording area 19 of photosensitive element 14 with pattern occupying only a portion of the available imaging space on photosensitive element 14. Each pattern is recorded based upon light that is focused onto micro-lenses 10 of array 8 using a primary lens system 4 that is adapted for forming a full frame image. Thus, as discussed in greater detail above, minor deviations of the design, manufacture, or placement of primary lens system 4 do not have a significant effect on the ability to record fine detail in the captured image.

Further, using this embodiment of camera 2, multiple images can be recorded on a single photosensitive element 14 without requiring more than a one-quarter pitch relative translation of array 8 and photosensitive element 14. Accordingly, it is not necessary to provide film movement structures such as automatic and manual film winding structures of the conventional type that move a roll of a film type photosensitive element from one frame to the next. Thus, as will be described in greater detail below, there are a variety of structures that can be used to enable camera 2 to perform such translations without adding the additional size, structure and cost associated with conventional film advance systems.

Figure 6:
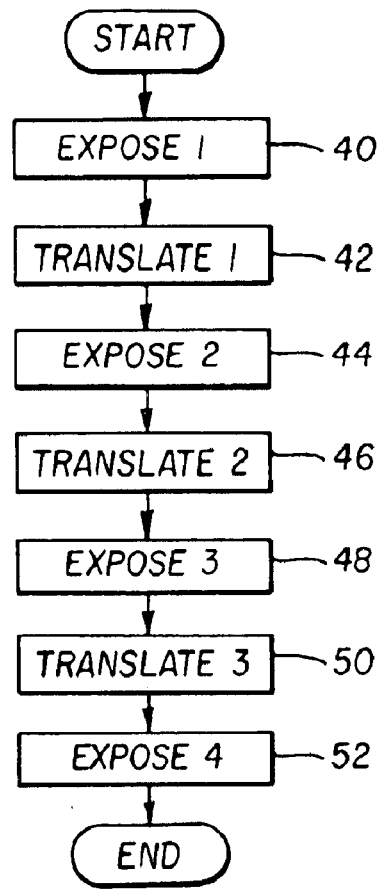
FIG. 6 shows a flow diagram of the steps of capture of multiple interlaced images according to one embodiment of the invention.

FIG. 6 shows a block diagram of one embodiment of an image capture method for capturing multiple interlaced images. Here, photosensitive element 14 is exposed to form concentrated image elements 18 in step 40 by operation of shutter assembly 6. In one embodiment, operation of shutter assembly 6 is coupled to translation step 42. In another embodiment, shutter assembly 6, coupled to a translation drive 38. Translation drive 38 is actuated by an act such as the act of resetting shutter assembly 6 for image capture. When actuated, translation drive 38 adjusts the relative position of micro-lens array 8 and photosensitive element 14, so that micro-lenses 10 focus light onto a previously unexposed portion of photosensitive element 14 (step 42). Photosensitive element 14 is again exposed at second exposure step 44, translated at translation step 46, receives a third exposure at exposure step 48, is translated again at translation step 50 and receives a fourth exposure at exposure step 52. It is appreciated that the number of exposure—translation operations depends on the number of exposures required in a specific application, on the geometry of the micro-lenses 10 in micro-lens array 8 and on the area of photosensitive element 14 exposed at each exposure step.

Figure 7A:
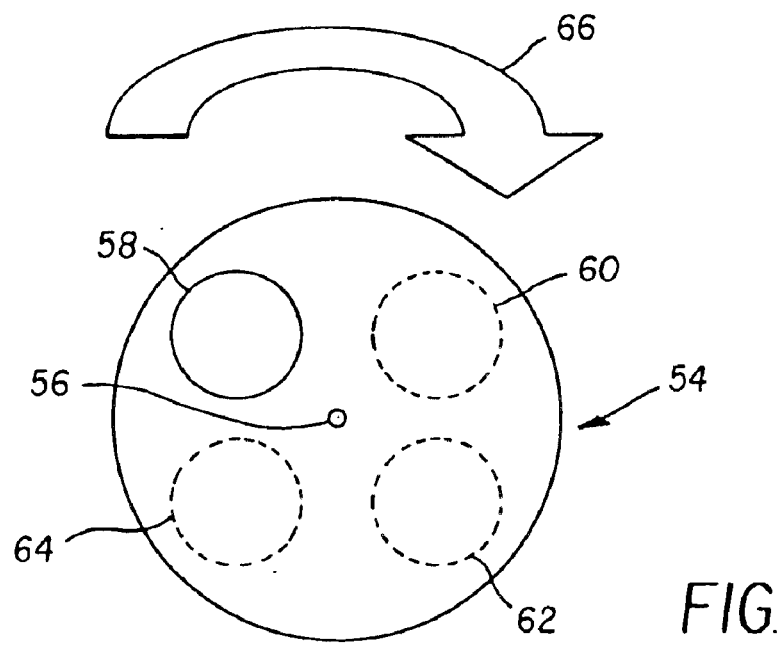
FIG. 7A schematically illustrates a face view of one embodiment of a mechanical drive mechanism for achieving the translation of FIG. 4A.

FIG. 7A schematically illustrates a face view of one embodiment of a translation drive 38 for achieving the translation of FIG. 4A. In this embodiment, translation drive 38 comprises a drive wheel assembly 54 that is rotationally impelled in direction 66 about axis 56. Drive wheel assembly 54 as a nub 58. Drive wheel nub 58 is shown in FIG. 4A at a first position which enables exposure of photosensitive element 14 to form concentrated image elements 18. A quarter rotation drives nub 58 to position 60 which enables exposure of photosensitive element 14 to form concentrated image elements 32, an additional quarter rotation drives the nub to position 62 which enables exposure of photosensitive element 14 to form concentrated image elements 34, while an additional quarter rotation drives nub 58 to position 66 which enables exposure of photosensitive element 14 to form concentrated image elements 36.

Figure 7B:
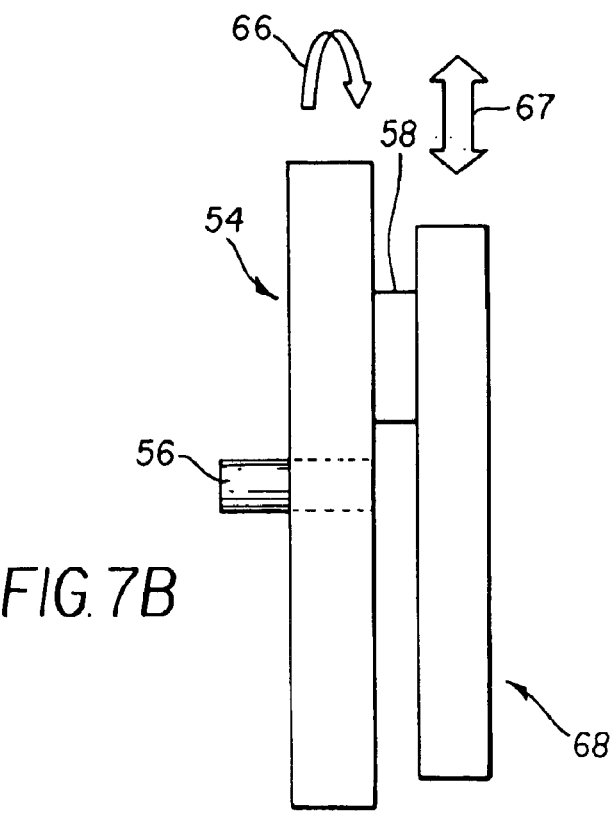
FIG. 7B schematically illustrates a side view of the mechanical drive of FIG. 7A.
Figure 7C:
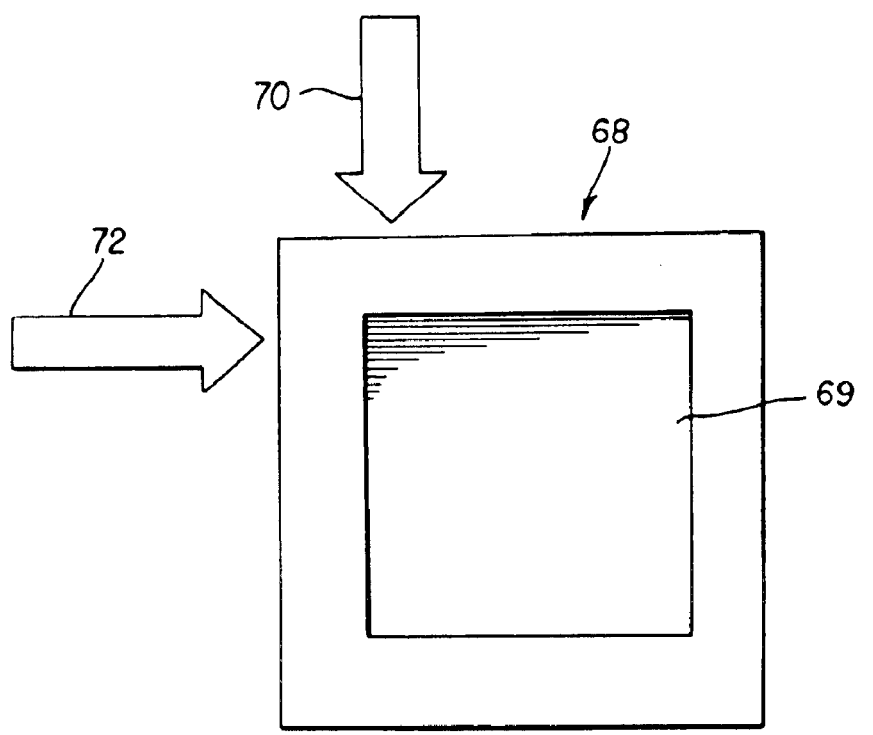
FIG. 7C schematically illustrates a further detail of the mechanical drive of FIG. 7A.
Figure 7D:
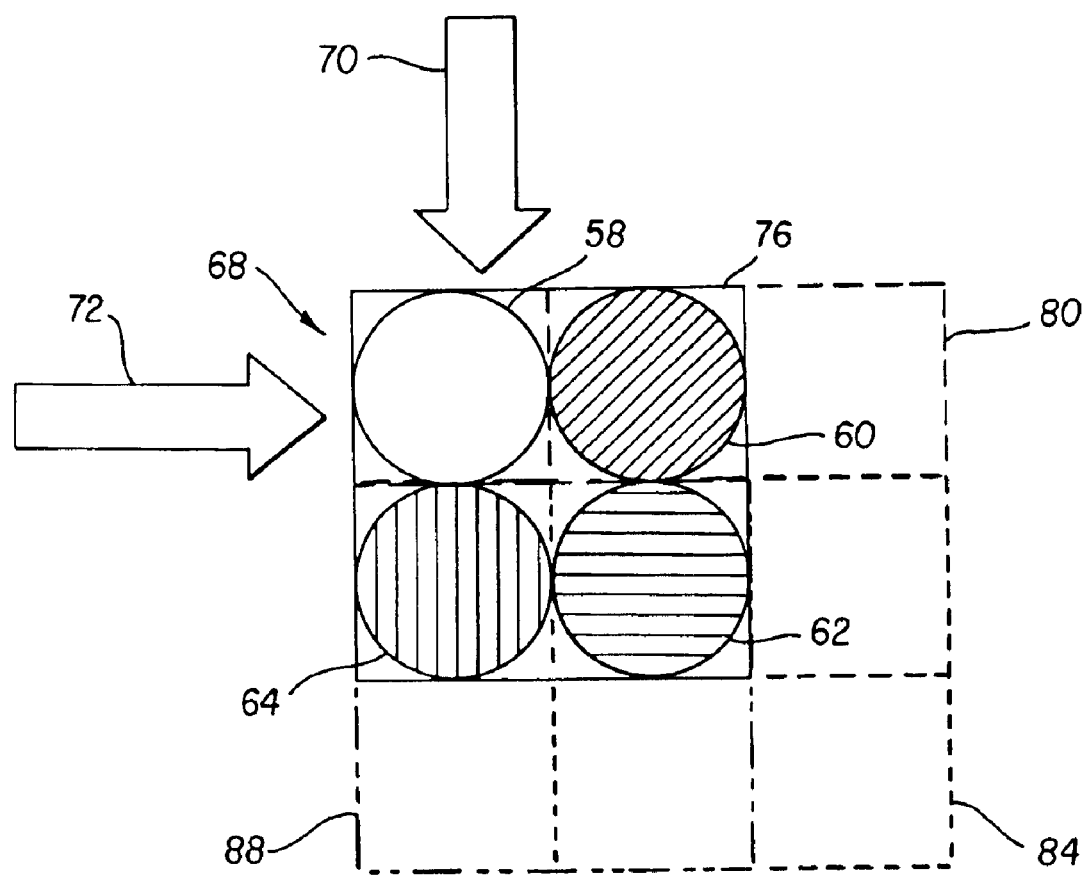
FIG. 7D further illustrates the translation of FIG. 4A.

FIG. 7B shows a side view of the mechanical drive of FIG. 7A. Here circular motion 66 of drive wheel assembly 54 is coupled by the nub 58 to translational motion 67 of a drive plate 68. FIG. 7C schematically illustrates a further detail of the mechanical drive of FIG. 7A. Here drive plate 68 has a recess 69. Nub 58 rides in recess 69 and couples motion of drive wheel 54 to drive plate 68. Guides, not shown, allow translational motion of drive plate 68 along specified directions 67 while mechanical loads 70 and 72 force drive plate 68 to be carried at one extreme of directions 67 as allowed by the position of nub 58. FIG. 7D illustrates that as nub 58 rotates to positions 60, 62 and 64 respectively, drive plate 68 advances from position 76, to position 80, to position 84 and then position 88 respectively. Drive plate 68 can comprise a structure that interacts with any of micro-lens array 8 and gate system 12 to adjust the relative position of micro-lens array 8 and photosensitive element 14. Drive plate 68 can also be formed from a common substrate or otherwise made to be a part of lens system 4, micro-lens array 8 and/or gate system 12. Rotation of drive wheel assembly 54 can be coupled to shutter release or shutter advance as previously described.

In another embodiment of the invention, translation drive 38 can take other forms, for example, prior art U.S. Pat. No. 5,279,123 mentions that shaped memory alloy (abbreviated to SMA) devices are well known in the art to undergo a martensitic (diffusionless) transition dependent upon the temperature applied to the SMA device. The SMA device when heated above its transition temperature undergoes a shape change to a memorized shape and when cooled below its transition temperature reverses the shape change from the memorized shape to an original shape. This change in shape can be used to provide mechanical work. Often, as disclosed in prior art U.S. Pat. No. 5,459,544, the SMA device is a metallic wire. When electrical current is applied to lead wires connected to opposite ends of the SMA wire, the SMA wire is heated due to electrical resistance and it shrinks or contacts, i.e. recovers, to a memorized shape. When the electrical current is cut, the SMA wire cools to extend, i.e. deform, to an original shape.

As is described in commonly assigned U.S. Pat. No. 6,242,841, such SMA materials can be usefully employed to perform the functions of motors and the like. Applied to the present invention, transition drive 38 can comprise two wires of SMA material that are used to selectively apply mechanical loads 70 and 72 and thus to provide electrically controlled adjustment of drive plate 68. This can allow for rapid adjustment of the position of drive plate 68 and can also enable a translation drive 38 to be incorporated into camera 2 that does not substantially increase the thickness of camera 2.

Similarly, translation drive 38 can comprise any of a number of well-known mechanical, electro-mechanical, or electrical electromagnetic or other drive systems that can be used to adjust the position of the drive plate 68.

Drive plate 68 can comprise a structure that interacts with any of primary lens system 4, micro-lens array 8, and gate system 12 to adjust the relative position of primary lens system 4, micro-lens array 8 and photosensitive element 14. Drive plate 68 can also be formed from a common substrate or otherwise made to be a part of lens system 4, micro-lens array 8 and/or gate system 12. Rotation of drive wheel assembly 54 can be coupled to shutter release or shutter advance as previously described.

Figure 8:
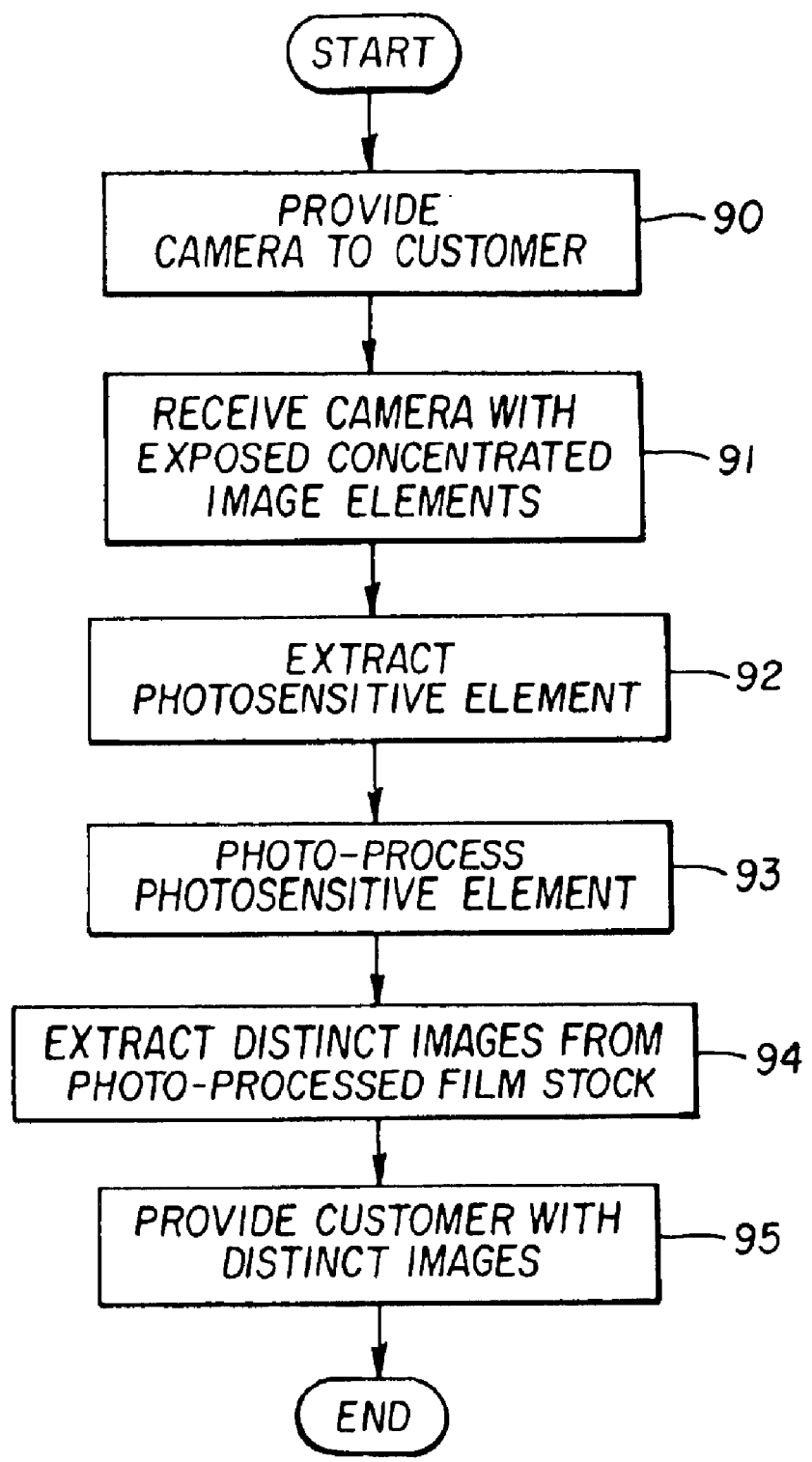
FIG. 8 shows a flow diagram of a method of providing a rental camera to a customer.

FIG. 8 shows a flow diagram of a method of providing a rental camera to a customer. Here the customer is provided a preloaded camera at step 90, the customer uses the camera to photograph scenes as described above, and the camera with exposed photosensitive element having scenes recorded thereon is received from the customer at step 91. The exposed photosensitive element 14 is extracted from the camera at step 92, and photoprocessed at step 93 to form a photoprocessed element 15, and distinct images are extracted from the photoprocessed element 15 at step 94. Either optical or electronic scanning methods and systems can be employed at this step as will be described elsewhere in this application. The formed images are then provided to the customer at step 95.

Camera 2 can be a reloadable camera or it can be supplied by the manufacture pre-loaded with photosensitive element 14 as known in the art. Photosensitive element 14 can be supplied in sheet form or supplied in roll form as a cartridge, canister or cassette as known in the art. When photosensitive element 14 is supplied in the form of a roll of film, a short length of photosensitive element 14 can be supplied with the cartridge, canister or cassette serving to aid introduction of the film into a conventional photo-processing apparatus.

Figure 9:
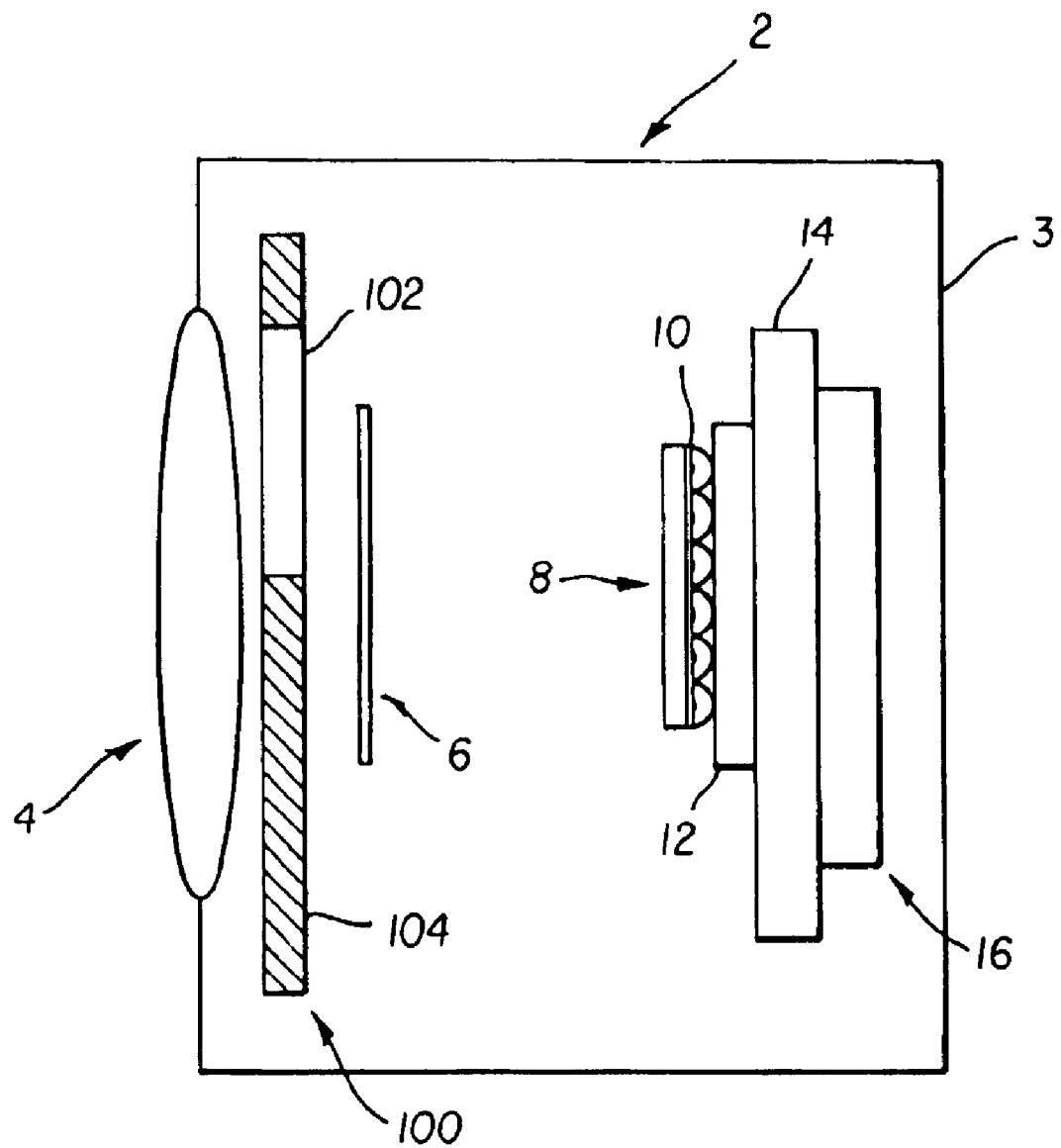
FIG. 9 illustrates another embodiment of a camera of the invention.
Figure 10A:
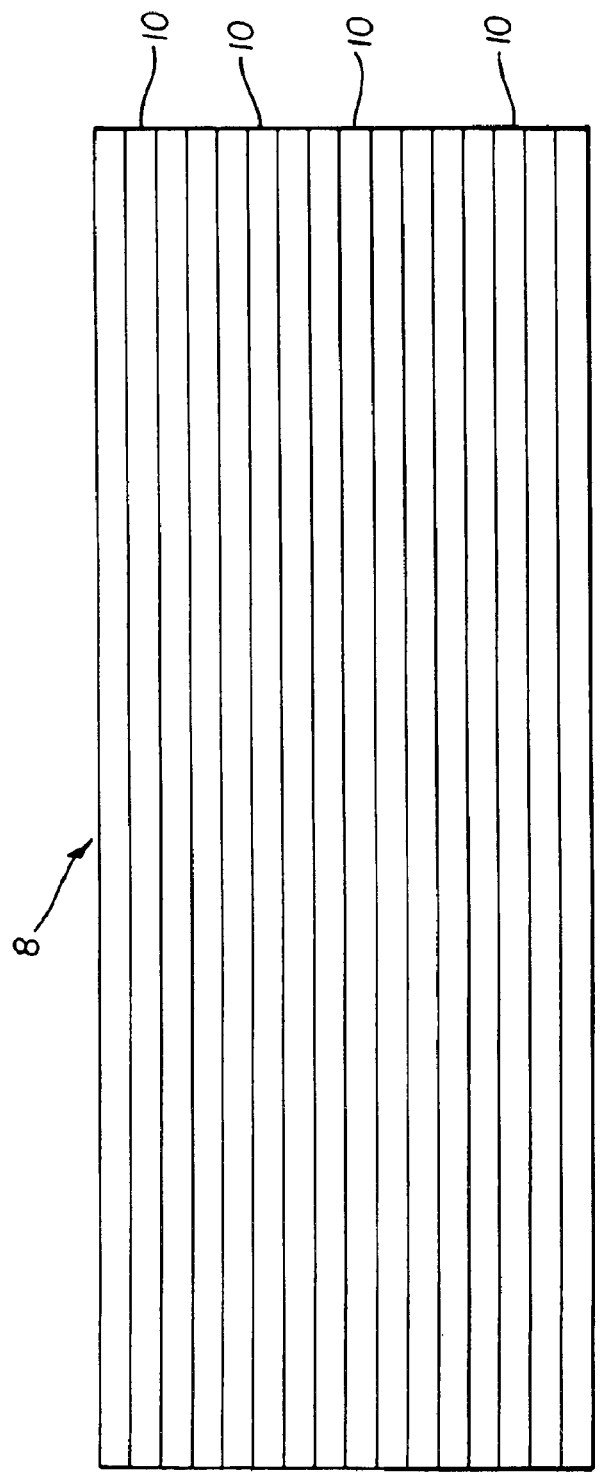
FIG. 10a illustrates a face view of an array of parallel partial cylindrical micro lenses.
Figure 10B:
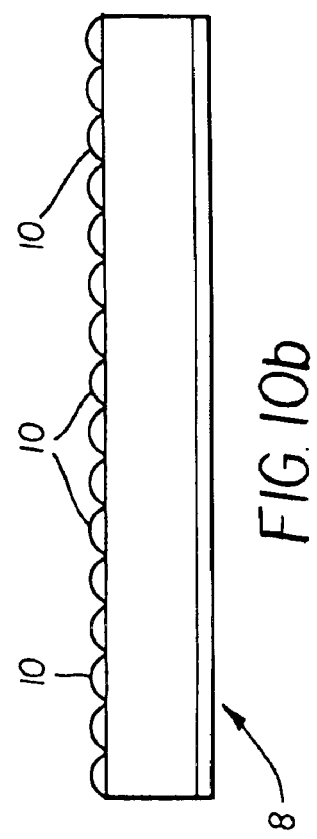
Figure 11A:
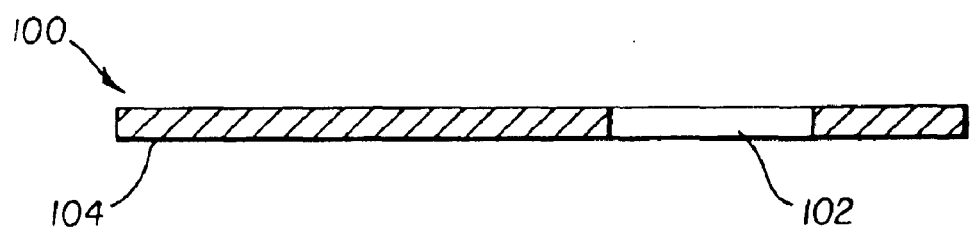
FIG. 11a illustrates a side view of an aperture stop system.
Figure 11B:
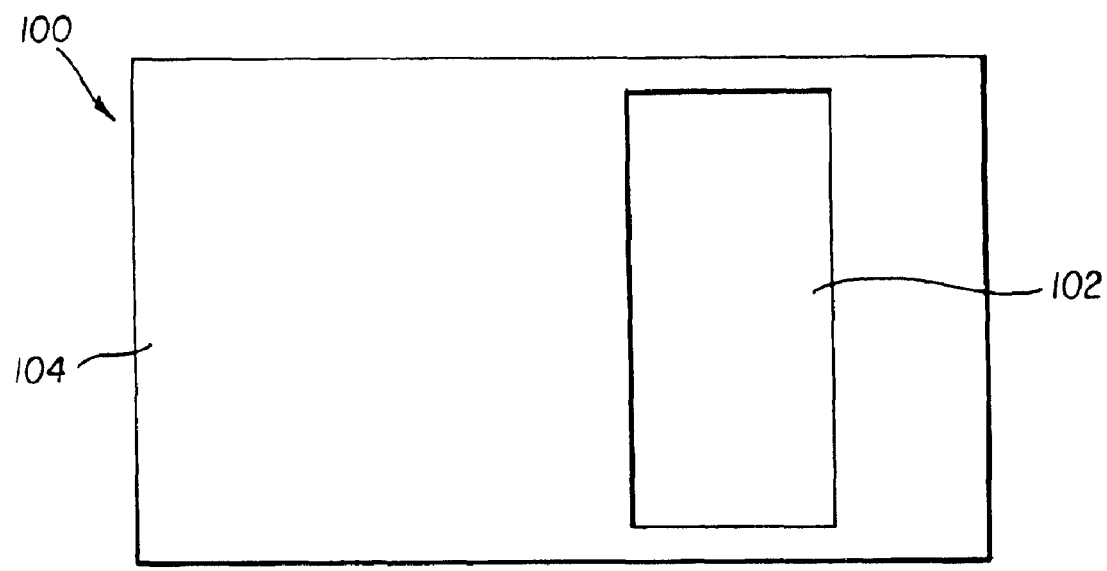
Figure 12A:
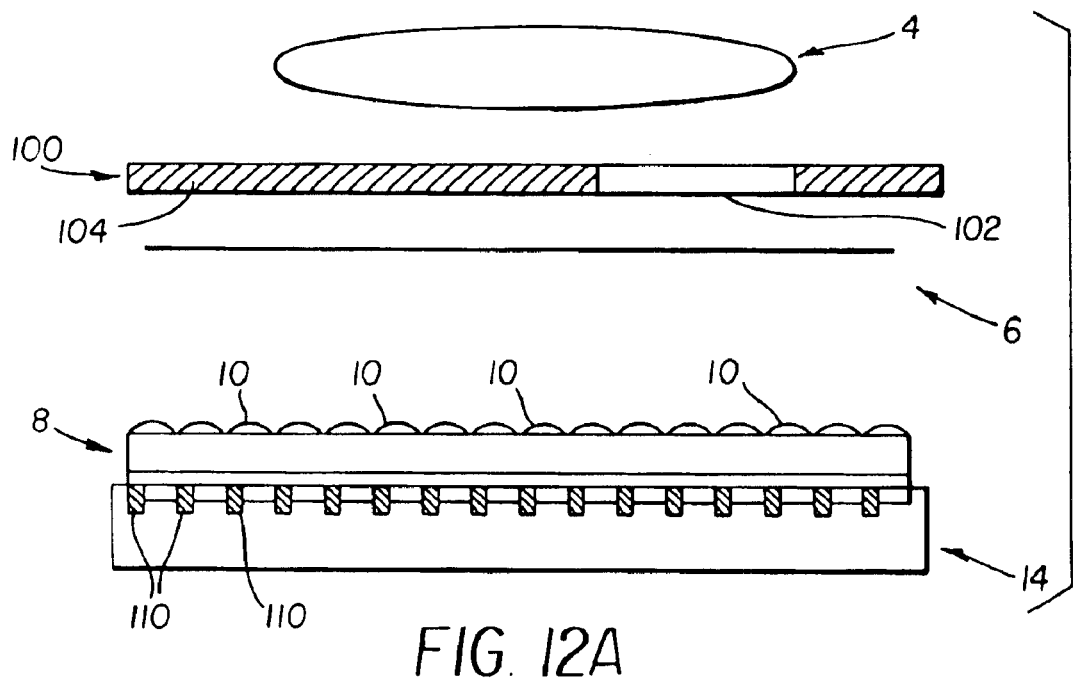
FIG. 12a illustrates the operation of the camera of FIG. 9.
Figure 12B:
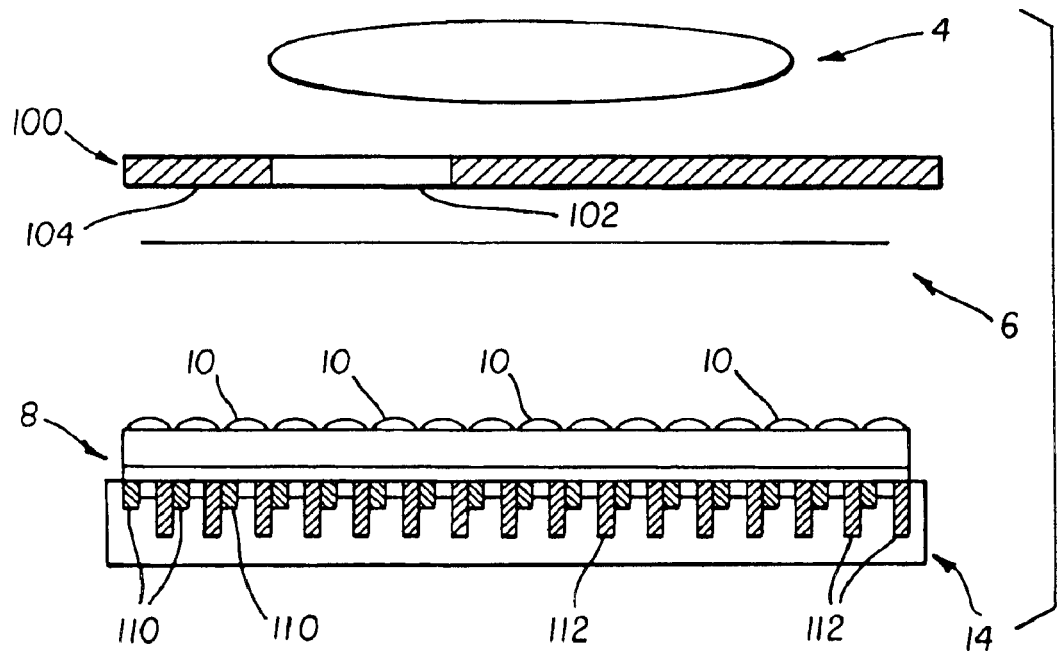
FIG. 12b further illustrates the operation of the camera of FIG. 9.

FIGS. 9, 10a, 10b, 11a, 11b, 12a and 12b illustrate another embodiment of the invention. FIG. 9 shows an alternative configuration for camera 2. Here, in addition to a primary lens system 4, shutter system 6, light sensitive film 14 and micro-lens array system 8, camera 2 additionally comprises an aperture stop system 100 having a transmissive aperture region 102 and an opaque region 104. Other components are as previously described. FIG. 10a illustrates a face-view of micro-lens array 8 having a series of parallel cylindrical cross-section micro-lenses 10. FIG. 10b illustrates a side-view of the same micro-lens system 8 having a series of parallel cylindrical cross-section micro-lenses 10. FIG. 11a illustrates a side-view of aperture stop system 100 having a transmissive region 102 and an opaque region 104. FIG. 11b illustrates a face-view of the same aperture stop system 100 having a transmissive aperture region 102 and an opaque region 104. The transmissive aperture region is 102 of aperture stop system 100 forms an asymmetric and generally rectangular aperture. The long axes of cylindrical cross-section micro-lenses 10 of micro lens array system 8 and the long axis of the transmissive aperture 102 of aperture system 100 are mounted so as to be parallel in camera 2 of FIG. 9. FIGS. 12a and 12b schematically illustrate the operation of the embodiment of camera 2 of FIG. 9. In FIG. 12a, aperture system 100 is positioned to partially obscure exposure of photosensitive element 14 by light as focused by primary lens system 4 when shutter system 6 is in an open position. The combination of partially obscured exposure of photosensitive element 14 by primary lens system 4 and cylindrical cross-section micro lenses 10 of micro lens array 8 results in exposure of a series of concentrated image elements comprising stripped regions 110 on photosensitive element 14. The width of the individual stripped regions 110 is modulated by the width of aperture 102.

FIG. 12a illustrates a rectangular aperture 102 that allows only a portion of the light collected by primary lens system 4 to strike micro lens array 8 and photosensitive element 14. The micro lenses 10 of micro lens array system 8 direct and focus the scene image to particular parallel regions of photosensitive element 14. FIG. 12b illustrates that repositioning of aperture stop system 100 so that rectangular aperture 102 allows light collected by primary lens system 4 from a distinct scene portion to strike micro-lens array 8 and photosensitive element 14 thereby exposing distinct regions 112 on photosensitive element 14. When regions 110 and 112 of photosensitive element 14 are exposed to different scenes at distinct times, photosensitive element 14 will thereby record the distinct patterns of concentrated image elements. It will be appreciated that an aperture stop system 100 that selectively obscures one-half of the scene light passed by lens system 4 when shutter system 6 is in an open position will enable two distinct patterns of concentrated image elements to be recorded on photosensitive element 14, with each pattern associated with a different one of the exposures. Similarly, an aperture stop system 100 that selectively obscures two-thirds of the scene light passed by lens system 4 when shutter system 6 is in an open position will enable three distinct patterns of concentrated image elements to be recorded on photosensitive element 14. Likewise, an aperture stop system 100 that selectively obscures four-fifths of the scene light passed lens system 4 when shutter system 6 is in an open position will enable five distinct patterns of concentrated elements to be recorded on photosensitive element 14, and so forth up to the optical resolution of the individual components of camera 2. Different scenes are exposed by selectively repositioning aperture stop system 100 between distinct openings of shutter system 6. It will further be appreciated, that lateral translation of any of the four components, primary lens system 4, aperture stop system 100, micro lens array 8 or photosensitive element 14 will similarly enable interleaved exposure of multiple scenes on a common photosensitive element.

Figure 13:
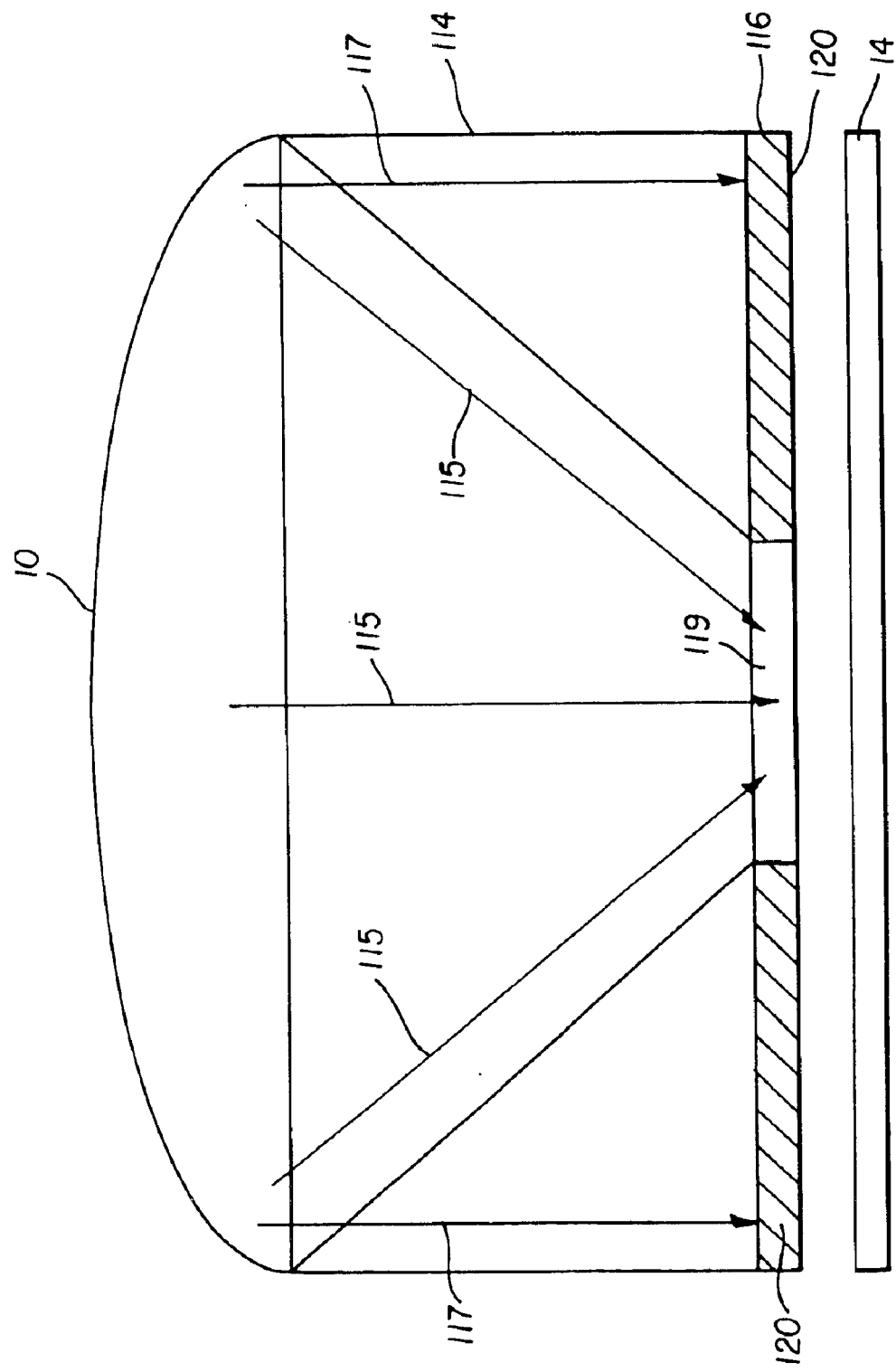
FIG. 13 illustrates the use of an optional light blocking structure between the micro-lens array and a photosensitive element.

As is shown in FIG. 13, in some embodiments, some portion of the focused light incident on each micro-lens 10 is concentrated 115 to form a concentrated image element on photosensitive element 14 and some of the light incident on micro-lenses 10, for example, light that is poorly focused by micro-lens 10 or light that passes between distinct ones of micro-lens 10 is not focused on the concentrated image element. This residual portion 117 of the light incident on micro-lens 10 can partially expose portions of photosensitive element 14 that may be used for forming concentrated exposure areas for other exposures and can therefore interfere with the fidelity of the recording of other concentrated image elements for other exposures such regions. Accordingly, in FIG. 13, a light blocking structure 116 is shown. As is shown in FIG. 13, light blocking structure 116 has a pathway 119 that permits concentrated light 115 to pass onto photosensitive element 14 and a light blocking area 120 that substantially blocks residual light 117 from passing to photosensitive element 14.

Figure 14B:
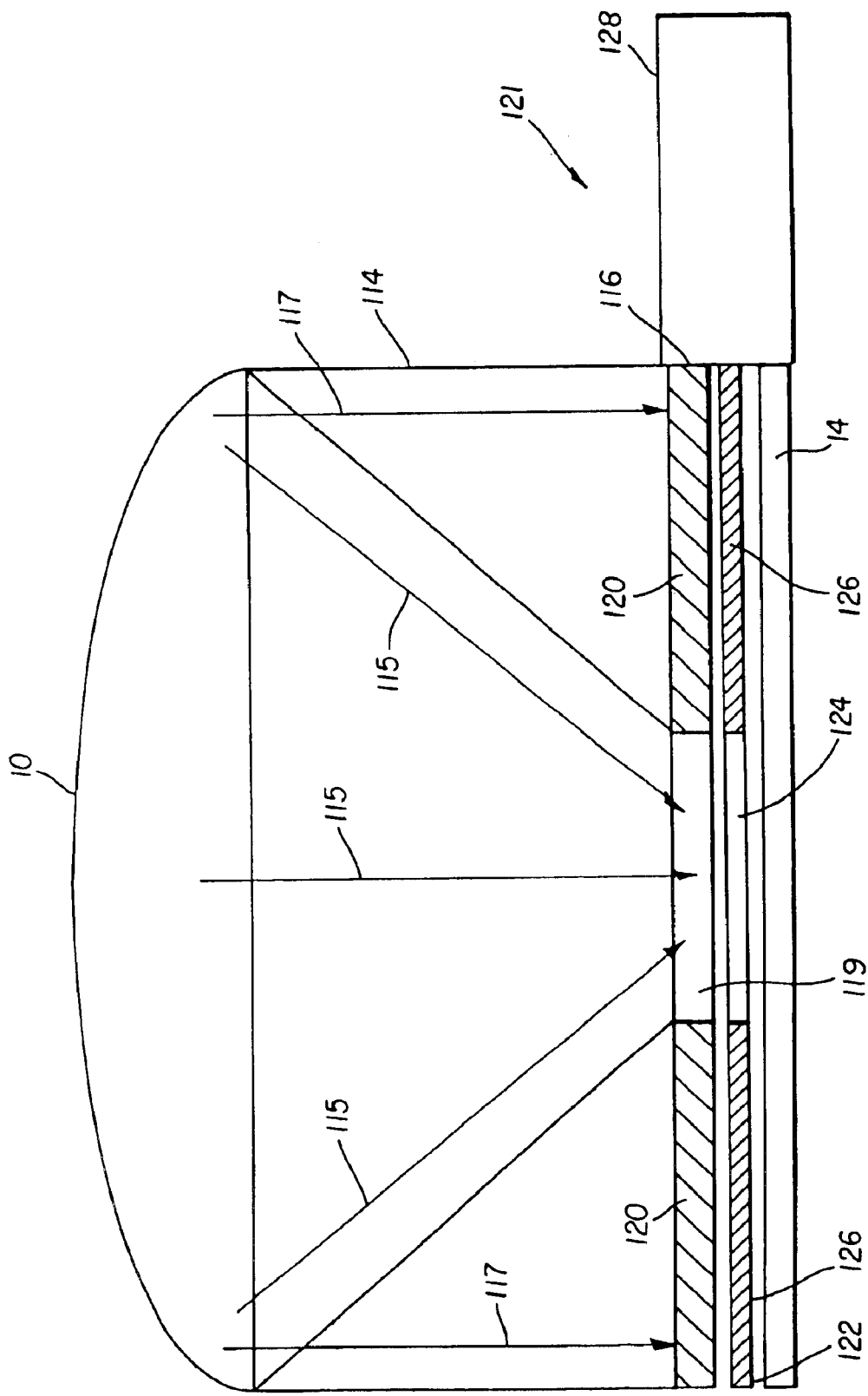
FIG. 14b illustrates the use of a shutter system in conjunction with a light blocking structure, micro-lens array and photosensitive element with the shutter system in an exposure position.

As is shown in FIGS. 14a and 14b the arrangement of FIG. 13 can cooperate with a shutter system 121 having a shutter 122 with an exposure area 124 that allows light to pass therethrough and a light blocking area 126. Between exposures, shutter 122 is positioned so that light blocking area 126 confronts pathway 119 as is shown in FIG. 14A. This prevents light from the scene from passing to photosensitive element 14. During an exposure, actuator 128 moves shutter 122 so that shutter exposure area 124 is positioned proximate to pathway 119 to allow concentrated light to pass from micro-lens 10 to photosensitive element 14 for a period of time, as is shown in FIG. 14B. The shutter system 121 can be adapted to adjust position where necessary because for example, the position of the array 8 of micro-lenses 10 is adjusted for subsequent exposures as discussed above. In this way, shutter system 121 can be provided that requires a relatively small movement path thereby reducing the size, weight, and cost of a camera incorporating such shutter system 121. In particular, various constructions can be used for actuator 128 including mechanical, thermal, electro-mechanical, magnetic and electro-magnetic systems. So called memory metals, arrangements of piezo-electric material, electro magnets and small solenoids and motors can be used to drive the required movements of the shutter system 121 all such systems can be made smaller and less expensive than conventional shuttering systems in that they do not require the relatively large movement paths and that are required for conventional shutter systems.

Image Recovery Process

After exposure, photosensitive element 14 is removed from camera 2 as known in the art. Any art known for photoprocessing can be employed to develop photosensitive element 14. The photoprocessing can comprise a development step with optional desilvering steps. The photoprocessing can be done by contacting photosensitive element 14 with photoprocessing chemicals or known agents enabling photoprocessing. The photoprocessing can be done by contacting the photosensitive element with aqueous solutions of photoprocessing chemicals or pH adjusting agents or both. Alternatively, the photosensitive element can be photoprocessed using an art known as photothermographic processing wherein the photosensitive element is photoprocessed by heating or by a combination of contacting with photoprocessing enabling agents and heat. As a result of photoprocessing photosensitive element 14 becomes a photoprocessed element 15 having more than one image wise exposed and developed image recorded thereon in the form of a pattern of concentrated image elements.

One embodiment is a method for recovering an acceptable image from a photoprocessed element 15, such as, a photoprocessing element 15 formed from photosensitive element 14 shown in FIG. 5 will now be described in detail with reference to FIGS. 15 and 16.

Figure 15:
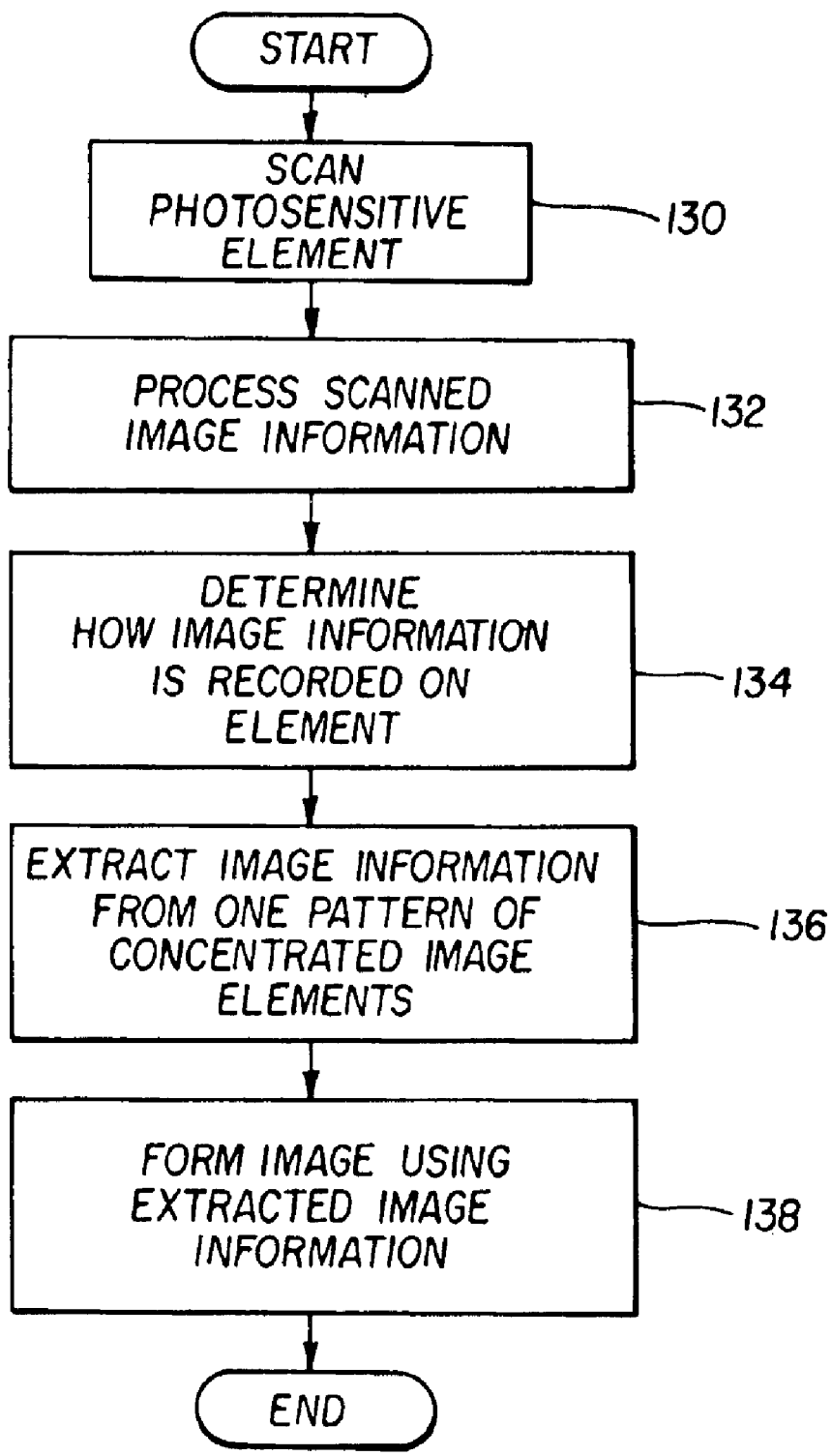
FIG. 15 is a flow diagram of one embodiment of a method for recovering an acceptable image from a photoprocessed element having concentrate images thereon.
Figure 16:
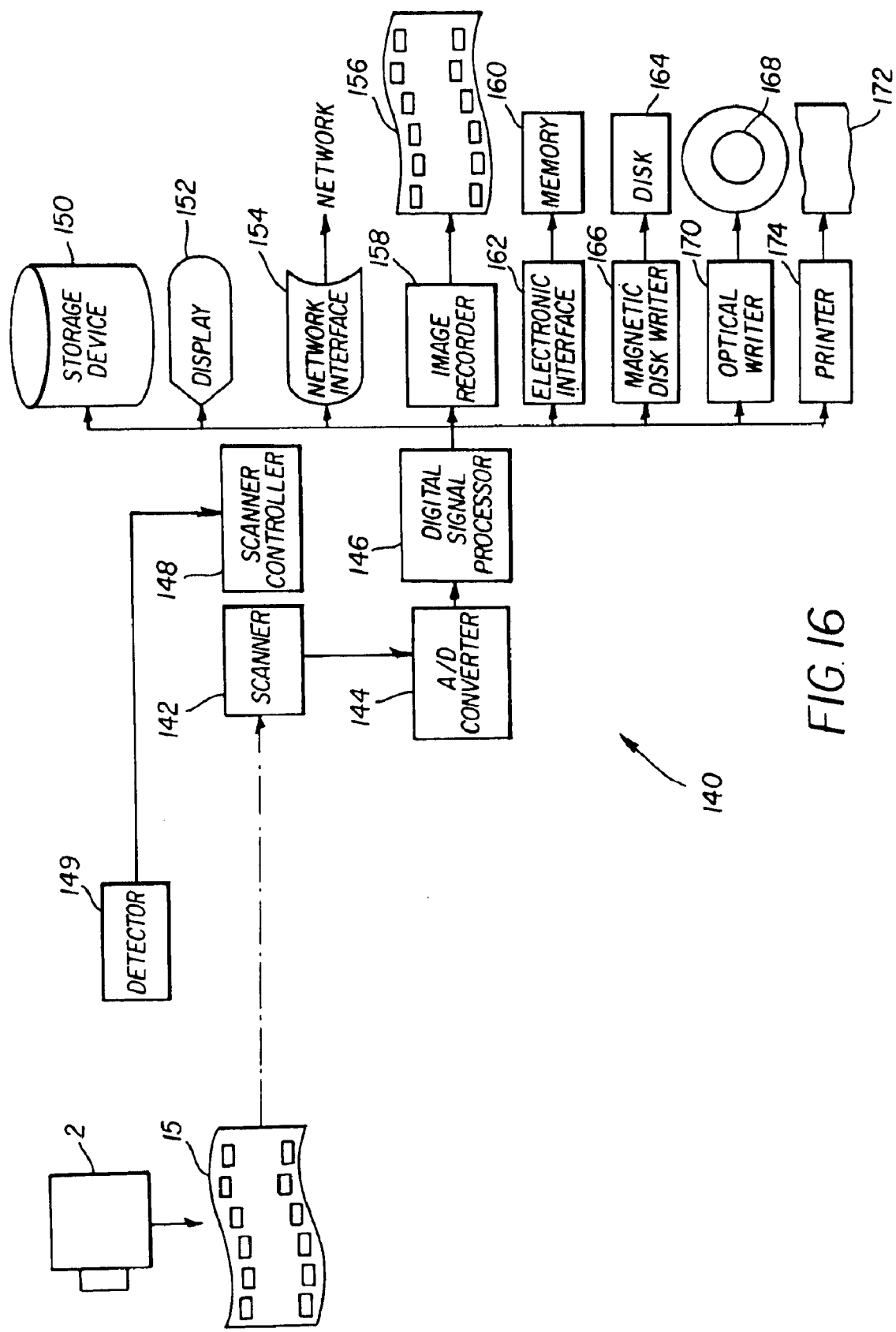
FIG. 16 is a flow diagram illustrating one embodiment of a reader system in accordance with the present invention.

In the embodiment shown in FIGS. 15 and 16, the method is performed using a reader system 140 having an image scanner 142 that is used to scan a photoprocessed element 15 and is used to form an image using the scanned data. In a first step of the method, image information is scanned from photoprocessed element 15 (step 130). In this step, the photoprocessed element 15 is scanned, for example, on a pixel-by-pixel basis using an array detector (not shown) such as an array charge-coupled device (CCD). Alternatively the photoprocessed element 15 can be scanned on a line-by-line basis using a linear array detector (not shown) such as a linear array CCD. Other types of conventional scanning methods and devices can be used. For pictorial imaging, a sequence of R, G, and B picture element signals are generated that can be correlated with spatial location information provided from scanner. Where necessary, this information is placed in digital form by an A/D converter 144. Signal intensity and location information is fed into digital signal processor, electronically processed, and then transmitted or stored in a storage device such as disk drive, presented on a display delivered using an electronic network such as a telecommunication system or the internet by way of a network interface; recorded on a photosensitive element using an photosensitive element image recorder; stored on an electronic memory such as a compact flash card or other portable electronic image storage device by an electronic data recorder; stored on a magnetic disk by a disk drive or recorded on an optical recording medium such as a Digital Video Disk, Compact Disk, or other optical recording medium by an optical writer, or printed on a receiver media including but not limited to paper, fabric, or tangible object by a printer such as a laser printer, ink jet printer, thermal transfer printer or other similar device.

One step in this process is the step of determining where and how imaging information is distributed on photoprocessed element 15 (step 132). A detector 149 can preferentially make this determination before photoprocessed element 15 is optically scanned. In this regard, detector 146 is adapted to detect signals that are encoded on photoprocessed element 15 or on an electronic memory associated with photoprocessed element 15. These signals indicate the distribution of images that are recorded on photoprocessed element 15 in the form of a pattern of image elements. This determination can be made by detecting signals that are optically, magnetically, or mechanically recorded on the photosensitive element, the camera or an enclosing cartridge or cassette at manufacture, during camera loading, during exposure or by a communication head associated with the camera. The determination can also be made by a user designation during the photofinishing process. In such an embodiment, detector 146 can comprise a manual input such as a switch or keyboard. By making this determination in advance of scanning, it is possible to adapt the scanning process to a mode that is best suited for recovering an acceptable image from the image that is recorded on photoprocessed element 15. When a distinct communication is employed, any communication scheme known in the art may be employed. Useful communication schemes include cartridge $D_x$ or $I_x$ codes, bar codes, on cartridge chips, photosensitive element optical characters, and photosensitive element magnetics such as disclosed in U.S. Pat. No. 6,222,607 B1 (Szajewski et al.).

Alternatively, scanner 142 can be used to optically scan a photoprocessed element and the multiple interlaced images separated based on fiduciary marks encoded on photosensitive element 14 by camera 2 during exposure. In a preferred embodiment, the determination is based upon the characteristics of the scanned image itself. In this embodiment, the image itself is scanned. The scanned image is examined to detect the characteristic dot or line patterns of concentrated image elements inherent in images formed according to the invention.

The scanning step (step 132) can be performed in any number of conventional manners using photosensitive element scanner 142. In one preferred embodiment, the image is scanned successively within blue, green, and red light within a single scanning beam that is divided and passed through blue, green and red filters to form separate scanning beams for each color record. If other colors are image wise present in photoprocessed element 15, then other appropriately colored light beams can be employed. Alternatively, when a monochromatic color forming material is employed, that material can be scanned and treated as such. As a matter of convenience, the ensuing discussion will focus on the treatment of color forming materials. In one embodiment, a red, green and blue light are used to retrieve image wise recorded information and photosensitive element is further scanned in infrared light for the purpose of recording the location of non-image imperfections. When such an imperfection or "noise" scan is employed, the signals corresponding to the imperfection can be employed to provide a software correction so as to render the imperfections less noticeable or totally non-noticeable in soft or hard copy form. The hardware, software and technique for achieving this type of imperfection reduction are described by U.S. Pat. No. 5,266,805 (Edgar) and WO 98/31142 (Edgar et al.), WO 98/34397 (Edgar et al.), WO 99/40729 (Edgar et al.) and WO 99/42954 (Edgar et al.).

In another embodiment, the formed image is scanned multiple times by a combination of transmission and reflection scans, optionally in infrared and the resultant files combined to produce a single file representative of the initial image. Such a procedure is described by U.S. Pat. Nos. 5,466,155, 5,519,510, 5,790,277; and 5,988,896 all in the name of Edgar et al.

Image data is processed (step 132) by signal processor 146 after scanning to ensure the fidelity of color data in advance of the recovery of image information from concentrated image areas. For example, specific techniques for transforming image-bearing signals after scanning are disclosed in U.S. Pat. No. 5,267,030 (Giorgianni et al.), U.S. Pat. No. 5,528,339 (Buhr et al.), U.S. Pat. No. 5,835,627 (Higgins et al.), U.S. Pat. No. 5,694,484 (Cottrell et al.), U.S. Pat. No. 5,962,205 (Arakawa et al.) and U.S. Pat. No. 6,271,940 B1 (Deschuytere et al.). Further illustrations of these procedures are provided by Giorgianni and Madden's *Digital Color Management*, Addison-Wesley, 1998. The signal transformation techniques disclosed can be further modified so as to deliver an image that incorporates the look selected by a customer. Matrices and look-up tables (LUTs) can provide useful image transformation. In one embodiment, three 1-dimensional look-up tables can be employed, one for each of a red, green, and blue color record. Due to the complexity of these transformations, it should be noted that the transformation can often be better accomplished by a 3-dimensional LUT. In another embodiment, a multi-dimensional look-up table can be employed, all as described in U.S. Pat. No. 4,941,039 (D'Errico).

In one variation, the R, G, and B image-bearing signals from scanner are converted to an image metric which corresponds to that from a single reference image-recording device or medium and in which the metric values for all input media correspond to the trichromatic values which would have been formed by the reference device or medium had it captured the original scene under the same conditions under which the input media captured that scene. For example, if the reference image recording medium was chosen to be a specific color negative film, and the intermediary image data metric was chosen to be the measured RGB densities of that reference film, then for an input color negative film, the R, G, and B image-bearing signals from a scanner would be transformed to the R', G', and B' density values corresponding to those of an image which would have been formed by the reference color negative photosensitive element had it been exposed under the same conditions under which the actual color negative material was exposed.

In another variation, if the reference image recording medium was chosen to be a specific color negative film, and the intermediary image data metric was chosen to be the predetermined R', G', and B' intermediary densities of that reference film, then for an input color negative photosensitive element according to the invention, the R, G, and B image-bearing signals from a scanner would be transformed to the R', G', and B' intermediary density values corresponding to those of an image which would have been formed by the reference color negative photosensitive element had it been exposed under the same conditions under which the actual color negative recording material was exposed. The result of such scanning is digital image data that is representative of the image that has been captured on photosensitive element.

Various other methods for processing this image data to recover image information from the scanned image data can be used. For example, useful image manipulation sequences are described by EP 0 961,482 A2 (Buhr et al.), EP 0 961,483 A2 (Buhr et al.), EP 0 961,484 A2 (Buhr et al.), EP 0 961,485 A2 (Buhr et al.) and EP 0 961,486 A2 (Buhr et al.).

The next step in the recovery process is to extract image data from the scanned and processed for at least one of the pattern of image data associated with one pattern of concentrated image elements (step 136). This requires that the image information from each concentrated image of each captured image is extracted from the scanned image data. This can be done in a variety of ways. For example, where metadata is recorded in association with photosensitive element 14, this metadata can indicate the areas on photosensitive element 14 that contain exposure areas that are associated with a particular exposure. Detector 149 can detect this metadata and signal processor 146, and/or scanner controller 148, can use the detected metadata to determine how to process the image information contained in image elements 18, 32, 34 and 36 and to recover individual images therefrom. Alternatively, reader system 140 can be preprogrammed to use image analysis techniques to analyze the scanned image data to detect patterns of concentrated image elements 18, 32, 34 and 36 recorded on photosensitive element 14. When such a reader system detects such a pattern, the reader system is preprogrammed to analyze the recorded patterns of concentrated image elements to determine the arrangement of concentrated image elements used to record each image and to identify image information for each image recorded on photosensitive element 14 based upon the pattern of image elements associated with that image.

This can be done, for example, using processor 124 to execute digital image analysis techniques such as digital edge detection and image signal frequency analysis. These techniques are simplified by the fact that the concentrated image elements will typically be associated with imaging information that has relatively identifiable density and predefined shape as compared to unexposed areas 20. Further, concentrated image elements 18, 32, 34 and 36 can have a uniform distribution pattern, such as the pattern of dot shaped concentrated image elements 18, 32, 34 and 36 shown in FIG. 5.

After image information for each image has been identified, techniques similar to those described in U.S. application Ser. No. 10/170,148, IMAGING USING SILVER HALIDE FILMS WITH MICRO-LENS CAPTURE, SCANNING AND DIGITAL RECONSTRUCTION, filed June 2002 in the names of Szajewski et al., the disclosure of which is incorporated by reference, can be used to form an image based upon each pattern of concentrated image elements such as image elements 18, 32, 34 and 36 (step 138).

In the embodiment, this is done by determining the densities of the concentrated image elements of a selected pattern of concentrated image elements 18, 32, 34 and 36, and code values are optionally assigned thereto.

After code values have been assigned to concentrated image elements associated with a first image, such as an image based upon concentrated image elements 18, an image is assembled for example using the code values. This image can then be further improved using color correction, image interpolation, sharpening, and/or other algorithms to process the image as will be described in greater detail below. Typical examples of pixel interpolation schemes include those utilized in digital cameras employing color filter arrays. Alternatively, pixel interpolation techniques as employed in scanning or image editing programs for up-sampling or smoothing images can be employed. This later approach has the benefit of providing finer detail in the resultant digital image. This process is repeated to obtain images from other concentrated image elements.

In an alternative embodiment, methods and apparatuses for optically recovering images from concentrated exposure areas such as exposure areas 18 using inverse-projection can be used. Examples of such methods are described in our commonly assigned U.S. application Ser. No. 10/167,794 entitled IMAGING USING SILVER HALIDE FILMS WITH MICRO-LENS CAPTURE AND OPTICAL RECONSTRUCTION, filed June 2002 in the names of Irving et al. which describes, among other things, a method for forming an output image from a photoprocessed element having at least one pattern of concentrated image elements displaced from a predefined pattern of concentrated image areas. In accordance with the method, light is modulated by the photoprocessed element and the modulated light is decompressed to extract an image from light modulated by a predefined pattern of concentrated image elements. The decompressed image is adapted so that the decompressed modulated light forms a decompressed image having the appearance of an image formed from a pattern of concentrated image elements that are placed within the predefined pattern of concentrated image elements and the decompressed image is focused at an imaging plane.

Figure 17:
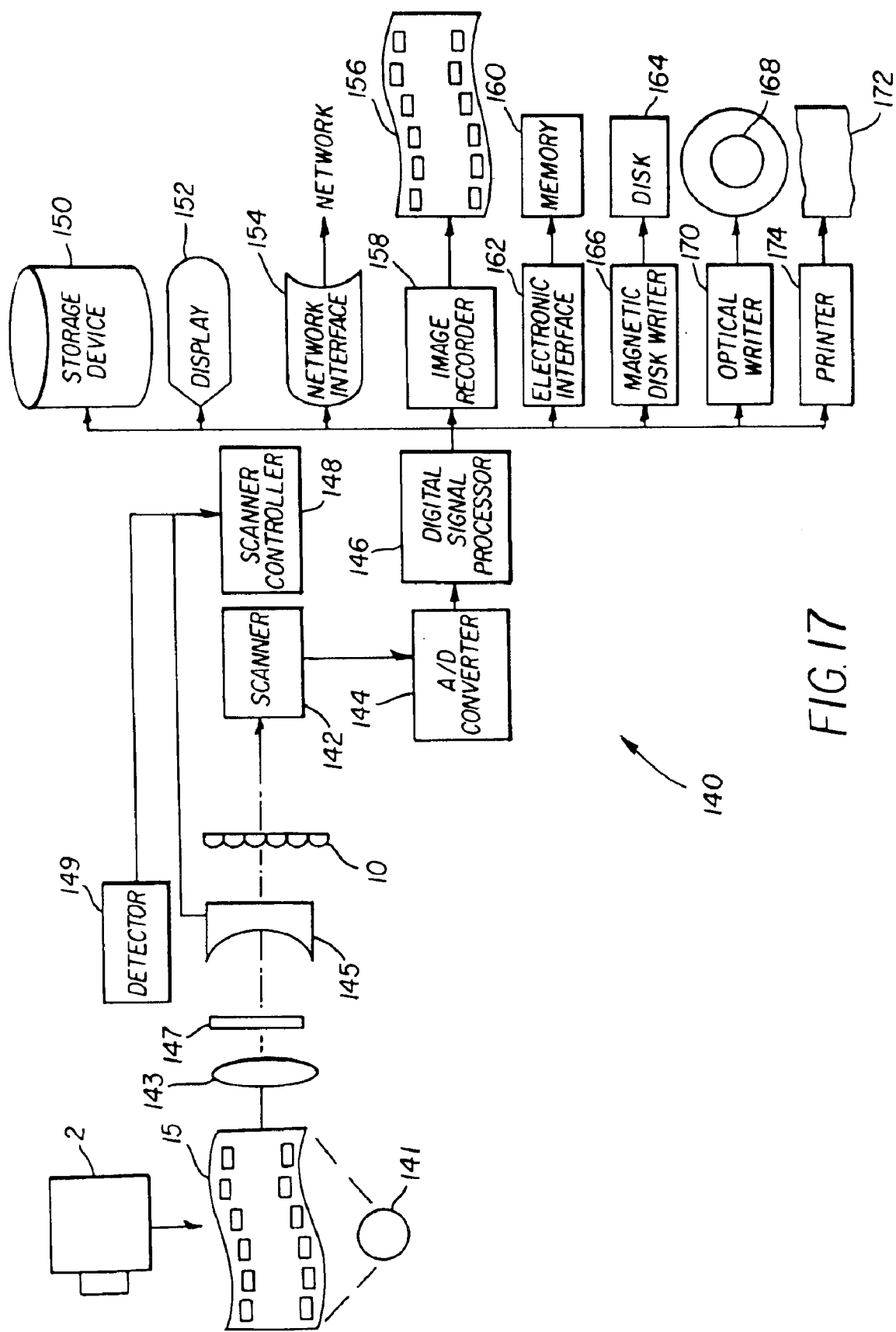
FIG. 17 is a diagram illustrating another embodiment of a reader system in accordance with the present invention.

In another embodiment, a reader apparatus 140 shown in FIG. 17 is described for forming an output image using a photoprocessed element 15 having at least one of a pattern of concentrated image elements recorded thereon. Reader apparatus 140 includes a light source 141 radiating light and a gate 143 positioning the photoprocessed element 15 to modulate light radiated by the light source. A micro-lens array decompresses light modulated by a predetermined pattern of concentrated image element areas on the photoprocessed element. The predetermined pattern differs from the pattern actually formed on the photoprocessed element. A lens unit 143 receives the decompressed light and forms an output image at an imaging plane. A field lens 145 is positioned between the array of micro-lenses and the lens unit. Field lens 145 adapts the decompressed light so that the output image contains an image that is based upon the pattern of concentrated image elements actually formed on the photoprocessed element. Such optical reconstruction can be used to form an image on a photographic paper or to form an image that is captured by scanner 142 in the manner described above. By translating at least one of the relative location of the field lens, taking lens, taking lens and/or photosensitive element 14 in a manner similar to that described above during capture, an image can be optically extracted from different patterns of concentrated image elements such as concentrated image elements 18, 32, 34 and 36. In one optional embodiment, field lens 145 can be incorporated into camera 2 to ensure that all images are formed on the photosensitive element 14 using a common pattern.

An optional inverse aperture 147 provides a controllable aperture that can be used to adapt light modulated by photoprocessed element 15 to discriminate between patterns of concentrated image elements.

It is to be appreciated that after separation and reconstruction, each image that is captured in electronic or digital form is readily amenable for other forms of image processing. Such other forms of image processing are not limited to the specific manipulations described above. Additional image manipulation may be used including, but not limited to, scene balance algorithms (to determine corrections for density and color balance based on the densities of one or more areas within the processed film), tone scale manipulations to amplify photosensitive element underexposure gamma as described in U.S. Pat. No. 5,134,573 (Goodwin et al), non-adaptive or adaptive sharpening via convolution or unsharp masking, red-eye reduction, and non-adaptive or adaptive grain-suppression. Moreover, the image may be artistically manipulated, zoomed, cropped, and combined with additional images or other manipulations as known in the art.

Besides digital manipulation, the digital images can be used to change physical characteristics of the image, such as "windowing" and "leveling" (used in computed tomography scanning) or other manipulations known in the art.

In either of the embodiments of FIGS. 15 and 17, once the image has been corrected and any additional image processing and manipulation has occurred, the image can be electronically transmitted to a remote location or locally written to a variety of output devices including, but not limited to, a storage device 150, a display 152, a network by way of a network interface 154, a photosensitive receiver element such as a photosensitive paper or film 156 by way of an image recorder 158, a memory 160 by way of a memory interface 162, a magnetic disk 164 by way of a magnetic disk writer 162, an optical disk 168 by way of an optical disk writer 170, or a medium 172 by way of a printer 174 such as a thermal printer, electro photographic printer, or ink-jet printer, and other types of storage devices and display devices known in the art. The output image-bearing signals can be adapted for a reference output device, can be in the form of device-specific code values or can require further adjustment to become device specific code values. Such adjustment may be accomplished by further matrix transformation, a 1-dimensional look-up table transformation, or a combination of such transformations to properly prepare the output image-bearing signals for any of the steps of transmitting, storing, printing, or displaying them using the specified device.

Characteristics of Micro-lens and Micro-lens Arrays

In the foregoing discussion, the use of an array 8 of micro-lenses 10 has been generally described. The individual micro-lenses 10 of array 8 are convergent lenses in that they are shaped so as to cause light to converge or be focused. As such, they form convex projections. The individual projections are shaped as portions of perfect or imperfect spheres. Accordingly, micro-lenses 10 can be spherical portion lenses or they can be aspherical portion lenses or both types of micro-lenses 10 can be simultaneously employed. A spherical portion micro-lenses 10 has the shape and cross-section of a portion of a sphere. An aspherical portion micro-lenses 10 has a shape and cross-section of a flattened or elongated sphere. In one embodiment, micro-lenses 10 have a circular or nearly circular projection with a diameter of between 1 and 1000 microns. Such spherical micro-lenses 10 can be arranged in a variety of combinations on array 8, including but not limited to the square arrangement shown in the projections 22 shown in FIG. 2B.

Figure 18D:
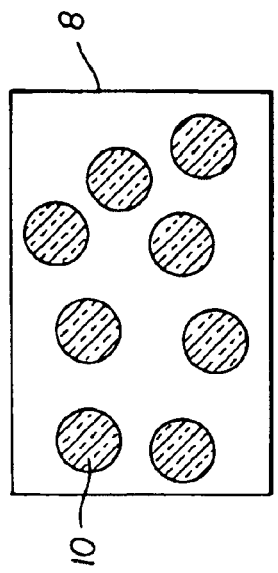
FIGS. 18a–18e illustrates embodiments of an array of micro-lenses useful in practicing the present invention.
Figure 18E:
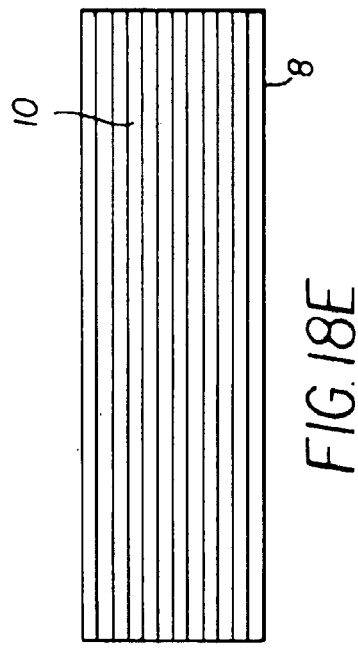
Figure 18A:
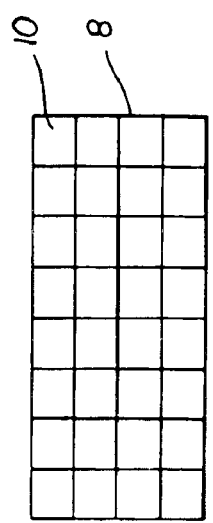
Figure 18B:
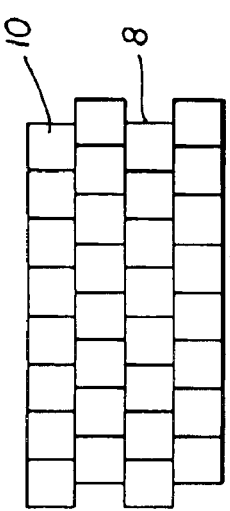
Figure 18C:
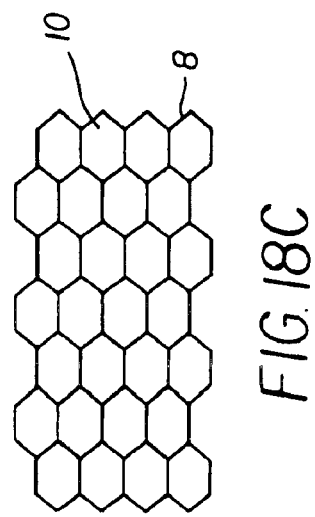

In particular, the forgoing discussion has generally presumed and described the use of the present invention in concert with a close packed cubic micro-lens array 8 of spherical micro-lenses 10. It will be appreciated that various configurations of micro-lenses 10 and micro-lens array 8 can be used. For example, FIG. 18 shows conceptually, a micro-lens array 8 of micro-lenses 10 arranged in a uniform cubic close packed distribution pattern on a support 190. It will be appreciated that other array patterns can be used. For example, FIG. 18b shows an embodiment having an off-set square close packed array pattern. In another embodiment shown in FIG. 18c micro-lenses 10 are arranged in micro-lens array 8 having a hexagonal close packed array pattern. Micro-lens array 8 can also feature random distributions of micro-lenses 10. One embodiment of an array having a random distribution is shown in FIG. 18d. As is also shown in FIG. 18e, in still another embodiment, micro-lens array 8 can comprise an array of cylindrical or acylindrical micro-lenses 10.

Figure 19A:
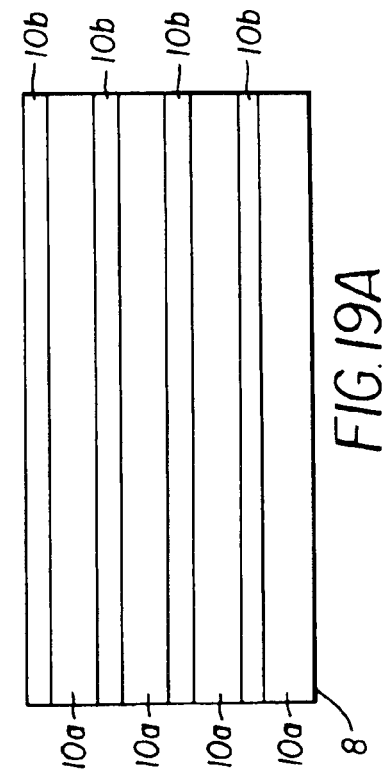
FIGS. 19a–19c illustrates various embodiments of arrays of different micro-lenses that can be usefully combined in a single array of microlenses.
Figure 19B:
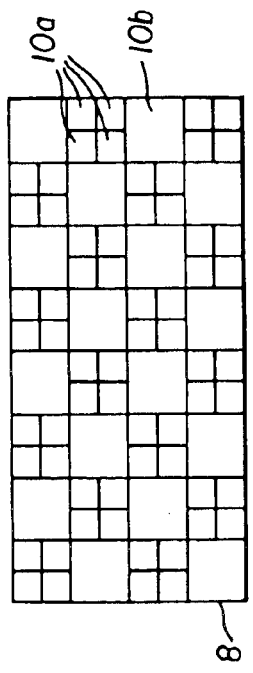
Figure 19C:
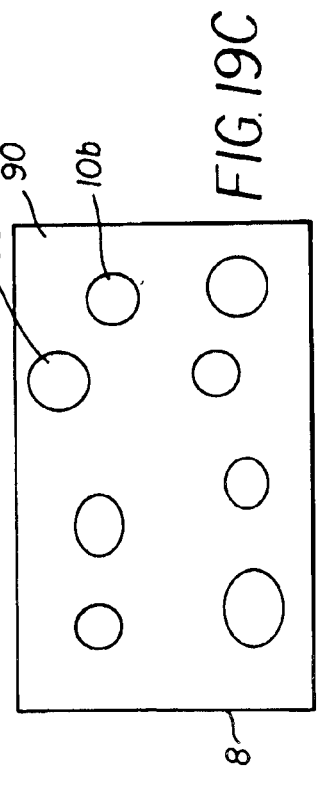
Figure 19D:
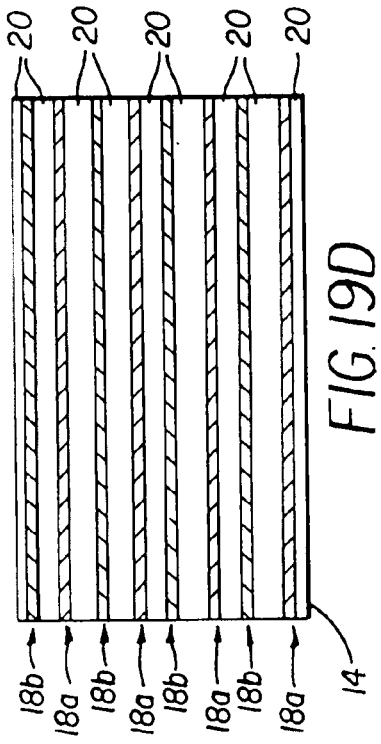
FIGS. 19d–19f illustrate patterns recorded on a photosensitive element by imagewise exposure of the photosensitive element to light from a scene passing through, respectively, the arrays of FIGS. 19a–19c.
Figure 19E:
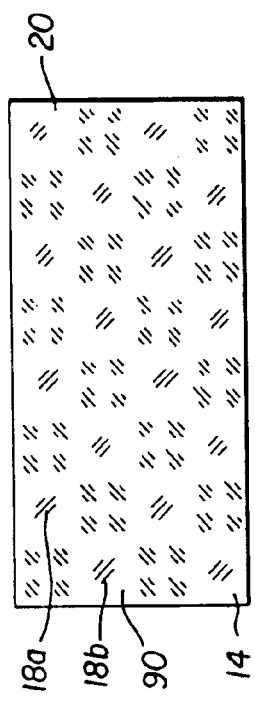
Figure 19F:
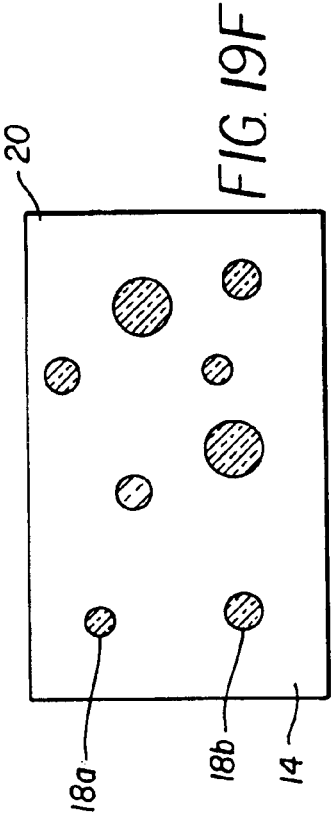

As is shown in FIGS. 19a, 19b, and 19c, micro-lens array 8 can comprise micro-lenses 10 having different optical characteristics. In the embodiment of FIG. 19a, a micro-lens array 8 of cylindrical micro-lenses 10 is shown. As is shown in FIG. 19a, micro-lens array 8 has a first set of micro-lenses 10a that have a greater cross-sectional area than a second set of micro-lenses 10b also provided by micro-lens array 8. In this embodiment, the first set of microlenses 10a concentrate a greater portion of light during an exposure than micro-lenses 10b. Thus, the first set of micro-lenses 10a form in a first set of concentrated image elements 10a, shown in FIG. 19d when the amount of the light during the exposure is within a first exposure range. When a light from the scene within a second exposure range, the second set of microlenses 10b in array 8 form a second set of concentrated image elements 18b. Light that is not concentrated by either set of micro-lenses 10a and 10b can be filtered to prevent exposure of unexposed area 20 of photosensitive element 14 of FIG. 19d.

Similarly, FIGS. 19b and 19c each show the use of a micro-lens array 8 having differently sized sets of micro-lenses 10a and 10b with the micro-lenses 10a concentrating light to form an exposure and directing that light onto concentrated image areas 18 on photosensitive element 14 when light from scene is within a first range. Micro-lenses 10b concentrate light from a scene and direct this light onto concentrated image areas 18b on photosensitive element 14 to form an exposure when the light from the scene is within a second range. Here too, steps are taken to reduce exposure of unexposed areas 20 of photosensitive element 14.

As is shown in FIG. 19c, the surface coverage of micro-lenses 10 does not have to be maximized and non-uniform arrangement of micro-lenses 10a and 10b be used to form concentrated image elements 18a and 18b on photosensitive element 14. While any useful surface coverage of micro-lenses 10 can be employed, the ratio of the projected area of the micro-lenses 10 to the projected area of the photographic or photosensitive element 14, can be at least 20 percent. In one embodiment, the coverage can be between at least 50 percent and up to 85 percent. In another embodiment, surface coverage of 85 percent up to the close-packed limit can be used. The precise degree of surface coverage can be adjusted to enable varying levels of exposure sensitivity while maintaining useful photographic graininess and sharpness. In any embodiment where the surface coverage is less than the close packed limit, support 180 can be defined to reduce or eliminate the ability of residual light to strike photosensitive element 14.

Micro-lens array 8 can comprise a set of individual micro-lenses 10 that are formed together or joined together, for example by extrusion, injection molding and other conventional fabrication techniques known to those in the art. Micro-lens array 8 can also be formed by combining a plurality of separate micro-lenses 10 fixed together by mechanical or chemical means or by mounting on support 180. The micro-lenses 10 can be formed in any matter known in the microstructure art. In still other embodiments, a micro-lens array 8 can be formed using a photosensitive coating.

Figure 20A:
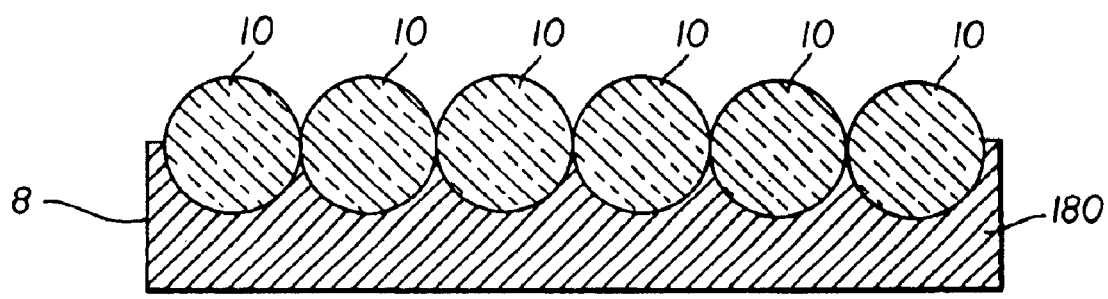
FIGS. 20a–20c illustrate of arrays of micro-lenses, spherical and aspherical lenses.
Figure 20B:
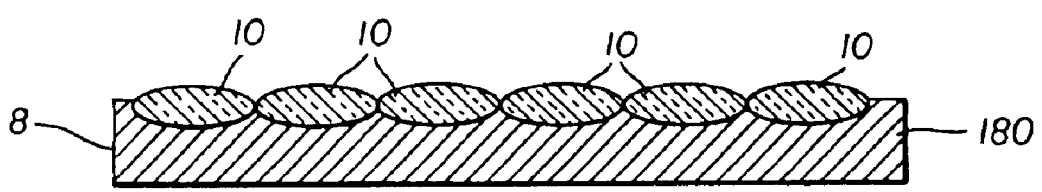
Figure 20C:
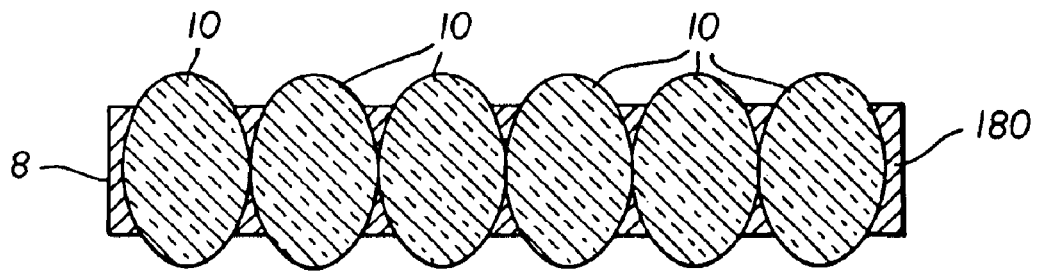

FIGS. 20a–20c show a cross-sectional view of micro-lenses 10 mounted in a support 180 and exhibiting example embodiments of various spherical and aspherical micro-lenses 10. FIG. 22a shows an embodiment wherein micro-lenses 10 comprise spherical lenses joined by support 180. FIGS. 22a and 22c show embodiments of micro-lens array 8 having spherical micro-lenses 10. It is appreciated that any of the above described array patterns may be combined with aspherical micro-lenses 10.

Micro-lenses 10 are shown in FIGS. 20a–20c with distinct hatching to illustrate the spherical and aspherical character of the protruding portion that actually forms the micro-lens. Aspherical micro-lenses 10, of the type shown in FIGS. 20b and 20c, are especially useful for this application in that the variable radius of such lenses allows for control of the lens focal length and lens aperture nearly independently of the spacing between the micro-lenses and light sensitive layers of photosensitive element 14. While these cross-sections have been described as spherical or aspherical, it is fully appreciated that the diagrams equally represent in cross-section cylindrical or acylindrical micro-lenses 10.

The light concentration or useful photographic speed gain on concentrating light focused by primary lens system 4 with a circular projection micro-lenses 10 is the square of the ratio of f-numbers of the camera 2 and the micro-lenses 10. Speed gain (in log relative exposure) in such a system can be determined as the speed gain equals 2× log (camera lens f-number/micro-lens f-number). The light concentration or useful photographic speed gain of cylindrical micro-lenses allow only the square root of such an improvement because they concentrate light in only one direction. The concentration of light by micro-lens array 8 enables both a system speed gain and forms an exposure pattern on the light sensitive material. The dimensions of camera 2 and the detailed characteristics of the taking lens system 22 dictate the exposure pupil to image distance, i.e. the operating camera focal length. Preferably, an image is formed at the array 8 of micro-lenses 10. The characteristics of micro-lenses 10 dictate their focal length. The micro-lens images are formed at the light sensitive layers of photosensitive element 14. The f-number of primary lens system controls the depth-of-focus and depth-of-field of camera 2 while the micro-lens f-number controls the effective aperture of camera 2. By using a stopped down f-number for the camera lens, excellent sharpness along with wide depth of focus and depth of field are obtained. By using an opened f-number for micro-lenses 10 of array 8, high system speed is obtained with emulsions that are typically thought of as "slow". This extra speed allows available light photography without the thermal and radiation instability typically associated with "fast" emulsions.

Accordingly, a useful combination of primary lens system 4 and micro-lenses 10 f-numbers will be those that enable system speed gains. System speed gains of more than 0.15 log E, or ½-stop, are useful, while system speed gains 0.8, 0.5 log E or more are preferred. While any micro-lenses 10 having an f-number that enables a speed gain with a primary lens system 4 having adequate depth-of-field for an intended purpose can be gainfully employed, typically micro-lenses 10 having f-numbers of 1.5 to 16 are useful. In certain embodiments, micro-lenses 10 having f-numbers in the range of f/2 to f/7 are useful. In other embodiments, micro-lenses 10 having f-numbers in the range of f/3 to f/6 are preferred.

When the spatial relationship between the individual micro-lenses and the light sensitive layers of a film are maintained through photoprocessing, as is the case with a photo-support having micro-lenses, both the pupils of the micro-lenses and their NA are maintained. However, when a distinct lenticular array is employed in taking and projection, then an additional constraint is encountered in obtaining a working system. This latter situation can arise for example when a camera with a mounted lenticular array is used in conjunction with a printer or scanner with a mounted lenticular array. Alternatively, it can arise when a film having a lenticular array that is altered or destroyed during photoprocessing is used in conjunction with a printer or scanner with a mounted lenticular array. In these situations, the condition for projecting only light passed through dots and not from surrounding areas is that the pattern, number and micro-lens power be maintained and that the numerical aperture of the projection system does not exceed the micro-image numerical aperture. The condition for projecting light passing through the dot and the surrounding area is that the pattern, number, and micro-lens power be maintained and that the numerical aperture of the projection system is matched to the micro-lens numerical aperture. The condition for projecting only light passing through the surrounding areas and not through the dots is that the patter, number, and micro-lens power be maintained and that the aperture of the projection system is a composite aperture obtained by adding micro-lens numerical aperture to an inverted micro-image numerical aperture. For a dot pattern, the micro-image NA for a particular micro-lens is derived from the dot radius and the micro-lens focal lengths. Parallel equations apply to line patterns.

Micro-image NA=sin θ and where tan θ=image dot radius divided by the corresponding micro-lens focal length.

Preferred design parameters for micro-lenses 10 and their relationship to the light sensitive layers of a photosensitive element 14 follow these definitions.

Micro-lens radius is the radius of curvature of the hemispheric protrusion of micro-lenses 10. For aspherical micro-lenses 10 this value varies across the surface of the micro-lens.

Micro-lens aperture is the cross-sectional area formed by the micro-lens typically described as a diameter. For spherical micro-lenses this diameter is perforce less than or equal to twice the micro-lens radius. For aspherical micro-lenses this diameter can be greater than twice the smallest radius encountered in the micro-lens. Use of differently sized micro-lenses having distinct apertures enables distinct levels of speed gain on a micro-scale and thus enables extended exposure sensitivity for a photographic layer.

Micro-lens numerical aperture=sin θ' and where tan θ'=micro-lens aperture radius (not radius of curvature) divided by micro-lens focal length.

Micro-lens focal length is the distance from micro-lenses 10 to photosensitive layers of photosensitive element 14. For micro-lenses 10 on the opposing side of a support relative to a light sensitive layer this is typically set to be about the thickness of the support. It is appreciated that use of micro-lenses enables distinct color records to be preferentially enhanced for sensitivity. This feature can be especially important in specific unbalanced lighting situations such as dim incandescent lighted interiors that are blue light poor and red light rich. For example, with systems intended for incandescent photography the microlenses can be focused on the film's blue sensitive layers thus providing a preferential speed boost to the color record and improved color balance. In other situations, other colors can be preferentially boosted.

Micro-lens f-number is the micro-lenses 10 aperture divided by the micro-lens focal length. For spherical micro-lenses 10, the desired micro-lens focal length can be used to define an appropriate micro-lens radius following a lens equation, thusly: Micro-lens radius is the micro-lens focal length times (n2−n1)/n2; where n1 is the refractive index of the material outside the micro-lens (typically air with a refractive index of unity) while n2 is the refractive index of the micro-lens and any contiguous transmissive material e.g. (plastics as used in array support 90). Photographically useful gelatin typically has a refractive index of 1.4 to 1.6. The ratio of the highest to the lowest refractive index can be between 0.8 and 1.2. In preferred embodiments, the ratio is between 0.95 and 1.05. Following the known refractive indices of typical photographic system components, useful spherical micro-lenses will have a micro-lens focal length about 3 times the micro-lens radius ((n2−n1)/n2~1/3). Non-integral micro-lenses 10 can be made from a wider variety of plastics and glasses.

Accordingly, micro-lenses 10 provided adjacent to a photosensitive element 14 such as a photosensitive element and located on the opposing side of the support from light sensitive layers will have a useful radius defined by the thickness of a film substrate. Typically, flexible substrates are between about 60 and 180 microns thick. In this context, it is appreciated that aspherical micro-lenses 10 enable a greater degree of design flexibility in adjusting micro-lens aperture and focal length to the other requirements of photographic supports. In an alternative embodiment, shorter focal length micro-lenses 10 can be employed on the emulsion side of the supports where the micro-lenses 10 are located on the same side of a support as the light sensitive layers and further from the support than the light sensitive layers. The desired focal length here would then be dictated by the thickness of any intervening layers. When there are intervening layers, they can be on the order of 1 to 50 microns or more in thickness. In the embodiment of FIG. 1, the micro-lens array 8 of micro-lenses 10 is separate from photosensitive element 14 and is separately mounted in camera 2 between camera taking lens system 22 and gate system 12. In this embodiment, the focal length is dictated by the differences in refractive index between the micro-lens material and the surrounding medium, typically air and the micro-lens radius of curvature. Additional details can be found in the cross-referenced, co-filled and commonly assigned U.S. Patent Application, the disclosures of which are incorporated by reference.

While any useful number of micro-lenses 10 can be employed in array 8 to achieve the desired results, it is recognized that the actual number to be employed in any specific configuration depends on the configuration. Camera mounted micro-lenses 10 with their great freedom in focal lengths can range from as little as 3 microns up to 500 microns or even larger in aperture or pitch. It will be appreciated that the size of the micro-lenses 10 is inversely proportional to the number of micro-lenses required to span a specified area. Accordingly, an array of cylindrical section micro-lenses 10 having a cylindrical micro-lens long axis aligned perpendicular to a long axis of a photosensitive element 14 such as 135-format film frame, roughly 24 by 36 mm in extent, can have between about 12,000 and 72 micro-lenses respectively at full surface coverage. The corresponding array of spherical section micro-lenses 10 when associated with a photosensitive element 14 comprising a 135-format frame can have between about 96 million and 3,456 micro-lenses respectively at full surface coverage. In one embodiment, micro-lens arrays having a pitch of between about 100 microns and 500 microns can be used.

Light from the scene can be passed through more than one array of micro-lenses 40. For example, light from the scene can be passed through a first micro-lens array having hemi-cylindrical micro-lenses arrayed along a horizontal axis and then passing this compressed light through a second micro-lens array having hemi-cylindrical micro-lenses arrayed along a vertical axis. This technique can be usefully employed to cause bi-axial concentration of the light from the scene.

It will be appreciated that, in accordance with the present invention, multiple images can be recorded on a photosensitive medium with different exposures occurring at different times. The exposures can be of the same scene at different times, or of different scenes. The subject matter of the exposures can be similar or different. The time separation between exposures can be under one second and can be as long as weeks or months later.

The invention has been described in detail with particular reference to certain preferred embodiments thereof, but it will be understood that variations and modifications can be effected within the spirit and scope of the invention.

Parts List

2 camera
3 camera body 4 primary lens system
6 shutter system
8 micro-lens array
10 micro-lenses
11 light receiving surface
12 gate system
13 spacer
14 photosensitive element
15 photoprocessed element
16 pressure plate
18 concentrated image element
20 unexposed areas
22 projected area of micro-lenses
25 first translation
26 projected area of micro-lenses after first translation
27 second translation
28 projected area of micro-lenses after second translation
29 third translation
30 projected area of micro-lenses after third translation
32 concentrated image elements for an exposure after first translation
34 concentrated image elements for an exposure after second translation
36 concentrated image elements for an exposure after third translation
38 translation drive
40 first exposure step
42 first translation step
44 second exposure step
46 second translation step
48 third exposure step
50 third translation step
52 fourth exposure step
54 drive wheel
56 axis of rotation
58 drive wheel nub as positioned before first translation
60 position of drive wheel nub after first translation
62 position of drive wheel nub after second translation
64 position of drive wheel nub after third translation
66 mechanically impelled direction of rotation of drive wheel
67 mechanically impelled direction of translation of drive plate
68 drive plate
69 recess in drive plate
70 load on drive plate
72 load on drive plate
76 drive plate recess as positioned before first translation
80 position of drive plate after first translation
84 position of drive plate after second translation
88 position of drive plate after third translation
90 provide camera to customer step
91 receive camera with images from customer step
92 extract photosensitive element
93 photoprocessed element
94 extract distinct images from photoprocessed element
95 provide customer with distinct images
100 aperture stop system
102 transmissive region of aperture stop system
104 opaque region of aperture stop system
110 exposure regions
112 distinct exposure regions
115 concentrated light
116 light blocking structure
117 residual portion of light
119 pathway
120 light blocking area
121 shutter system
122 shutter
124 exposure area
126 light blocking area
128 aperture
130 scan photosensitive element step
132 process scanned image information step
134 determine how image information is recorded on element step
136 extract image information from one pattern of concentrated image elements step
138 form image using extracted image information step
140 reader system
141 illumination source
142 scanner
143 lens system
144 A/D converter
145 field lens
146 digital signal processor
147 inverse aperture
148 scanner controller
149 detector
150 storage device
152 display
154 network interface
156 photosensitive receiver element
158 image recorder
160 memory
162 electronic interface
164 disk
166 magnetic disc writer
168 optical disc
170 optical disc writer
172 medium
174 printer
180 support

What is claimed is:

1. A camera for recording more than one image on a photosensitive element, the camera comprising:
a primary lens system focusing light from a scene at an imaging plane;
a gate positioning a photosensitive element;
an array of micro-lenses arranged at the imaging plane and focusing light received from the primary lens system to form a pattern of concentrated image elements on the photosensitive element positioned at the gate;
a shutter assembly adapted to controllably allow light to flow from the scene to the array of micro-lenses for a period of time defining an exposure; and
a translation drive adapted to adjust the position of at least one of the primary lens system, the array of micro-lenses, and the gate so that the micro-lenses focus light received during different exposures onto different portions of the photosensitive element,
wherein the concentrated image elements formed during different exposures are at least in part recorded in an interspersed manner on the photosensitive element.

2. The camera of claim 1, wherein the shutter assembly and translation drive are operatively joined so that actuation of the shutter assembly causes the translation drive to adjust the position of at least one of the primary lens system, the array of micro-lenses, and the gate.

3. The camera of claim 1, wherein the micro-lenses have a separation and wherein the translation drive is adapted to make a relative adjustment of less than the separation of the micro-lenses.

4. The camera of claim 1, wherein the micro-lenses have a separation and wherein the translation drive is adapted to make a relative adjustment of less than a multiple of 1.5 of the separation.

5. The camera of claim 4, wherein the translation drive makes adjustments in a range of between 2 microns and 200 microns.

6. The camera of claim 1, wherein the translation drive comprises a cam assembly that adjusts the relative position of at least one of the primary lens system, array of micro-lenses, and the gate after each exposure.

7. The camera of claim 1, wherein the translation drive comprises at least one of an arrangement of electro-thermal, electro-magnetic and/or electro-mechanical actuator that adjusts the relative position of at least one of the primary lens system, the array of micro-lenses, and the gate after each exposure.

8. The camera of claim 1, wherein the translation drive comprises a cam that is moved for each exposure and a drive plate that engages the cam and controls the relative position of at least one of the primary lens system, the array of micro-lenses, and the gate.

9. The camera of claim 1, further comprising a light blocking structure for blocking light that passes through each micro-lens that is not concentrated thereby to form a concentrated image element.

10. The camera of claim 9, wherein the shutter system comprises a shutter assembly having a shutter with light blocking areas and light pathways arranged to cooperate with the micro-lenses to block concentrated light from passing from the micro-lenses to the photosensitive element except during an exposure.

11. The camera of claim 1, wherein the translation drive is adapted to adjust the position of at least one of the primary lens system, the array of micro-lenses, and the gate in a pattern determined at least in part based upon the arrangement of micro-lenses in the array.

12. The camera of claim 1, further comprising an aperture stop structure defining the aperture between the lens system and the micro-lens array wherein the translation drive is adapted to adjust the position of the aperture by adjusting the position of the aperture stop relative to at least one of the lens system, array of micro-lenses, and the gate so that the micro-lenses focus light received from the primary lens system during different exposures onto different portions of the photosensitive element.

13. The camera of claim 1, further comprising a field lens to adapt light from the scene so each pattern of concentrated image elements is formed in accordance with a predefined arrangement.

14. A camera for recording more than one image on a photosensitive element, the camera comprising:
a primary lens system focusing light from a scene at an imaging plane, said primary lens system defining an aperture;
a gate positioning the photosensitive element;
an array of micro-lenses arranged at the imaging plane and focusing light received from the primary lens system to form a pattern of concentrated image elements on the photosensitive element positioned by the gate;
a shutter assembly adapted to move between a first position that blocks light from flowing from the scene to the array of micro-lenses and a second position that permits light to flow, with movement between the first position and second position defining an exposure; and
a translation drive adapted to adjust the position of at least one of the aperture, the array of micro-lenses, and the photosensitive element so that the micro-lenses focus light received from the primary lens system during different exposures onto different portions of the photosensitive element that have not previously been exposed to concentrated light,
wherein each pattern of concentrated image elements formed during different exposures is distributed across substantially all of an image recording area provided by the photosensitive element.

15. The camera of claim 14, wherein the pattern of concentrated image elements is distributed in a generally uniform pattern on the array of micro-lenses.

16. The camera of claim 14, wherein each pattern of concentrated elements is arranged on the photosensitive element in a manner that permits image information to be scanned using equipment adapted to scan conventional images of the type recorded on such a photosensitive element by a conventional camera.

17. The camera of claim 14, wherein the micro-lenses are distributed on the micro-lens array in a pattern that provides sufficient separation between the concentrated image elements to permit recording at least some of the concentrated image elements for one exposure on the photosensitive element among the concentrated image elements of another exposure.

18. A camera comprising:
a lens unit for focusing light from a scene onto an imaging plane;
a light modulating means for concentrating the light focused by the lens means to form a pattern of concentrated light elements on the photosensitive element;
an exposure control means for controllably allowing light to pass from the scene to the photosensitive element for a period of time to define an exposure; and
an adjustment means for causing the concentrated image elements of each exposure to be recorded on different portions of an image receiving area of the photosensitive element.

19. The camera of claim 18, wherein each pattern of concentrated image elements formed during different exposures is distributed across substantially all of an image recording area provided by the photosensitive element.

20. The camera of claim 18, wherein each pattern of concentrated image elements is distributed over more than half of an image recording area provided by the photosensitive element.

21. The camera of claim 18, further comprising a concentrated image pattern adapting means for adapting light from the scene so each pattern of concentrated image elements is formed in accordance with a predefined pattern.

22. A method for capturing at least two images on a photosensitive elements the method comprising the steps of:
exposing a photosensitive element to light from a scene;
focusing the light from the scene exposure onto an imaging plane and concentrating the focused light to form a pattern of concentrated image elements on the photosensitive element during the exposure;
subsequently exposing the photosensitive element to light from a distinct scene;
focusing the light from the subsequent distinct scene exposure onto an imaging plane and concentrating the focused light from the subsequent distinct scene exposure to form a different pattern of concentrated image elements on a different portion of the photosensitive element, wherein the patterns of concentrated image elements formed during each exposure are at least in part interspersed.

23. The method of claim 22, wherein each pattern of concentrated image elements formed during different exposures is distributed across substantially all of an image recording area provided by the photosensitive element.

24. The method of claim 22, wherein each pattern of concentrated image elements formed during different exposures is distributed across more than half of an image recording area provided by the photosensitive element.

25. The method of claim 22, wherein the step of concentrating the focused light to form a pattern of concentrated image elements on the photosensitive element during the exposure comprises passing the focused light through an array of micro-lenses positioned at the imaging plane, each micro-lens adapted to concentrate the focused incident thereon light to form a concentrated image element on the photosensitive element.

26. The method of claim 25, wherein the step of concentrating the focused light from each subsequent exposure to form a different pattern of concentrated image elements on a different portion of the photosensitive element comprises adjusting the relative position of the array of micro-lenses and the photosensitive element so that the different patterns of concentrated image elements formed during each subsequent exposure are at least in part interspersed.

27. The method of claim 25, wherein the step of concentrating the focused light from each subsequent exposure to form a different pattern of concentrated image elements on a portion of the photosensitive element that has not yet been exposed to concentrated light, comprises adjusting an aperture so that the different patterns of concentrated image elements formed during each subsequent exposure are at least in part interspersed.

28. The method of claim 22, further comprising the step of adapting light from the scene so each pattern of concentrated image elements is formed in accordance with a predefined pattern.

29. A reader apparatus for forming an output image using a photoprocessed element having at least two patterns of concentrated image elements, the apparatus comprising:

a light source radiating light;

a gate positioning the photoprocessed element to modulate light radiated by the light source;

a micro-lens array adapted to decompress light modulated by predetermined patterns of concentrated image element areas on the photoprocessed element, said predetermined pattern differing from the pattern actually formed on the photoprocessed element;

a lens unit receiving the decompressed light and forming an output image at an imaging plane;

a field lens between the array of micro-lenses and the lens unit, with the field lens adapting the decompressed light so that the output image contains an image that is based upon one of the patterns of concentrated image elements actually formed on the photoprocessed element; and a positioning system for adjusting the relative position at least one of the micro-lens array, lens unit, field lens or gate so that the micro-lens array can decompress light modulated by a selected one of the pattern of concentrated image elements recorded on the photoprocessed element.

30. The reader apparatus of claim 29, wherein the reader further comprises a detector for detecting a signal indicative of the patterns formed on the photoprocessed element and a controller for interpreting the signal and controllably adjusting the position of the field lens.

31. The reader apparatus of claim 29, wherein the reader further comprises a detector for detecting a signal indicative of the patterns formed on the photoprocessed element and a controller for interpreting the signal and controllably operating the positioning system so that image information is formed based upon light modulated by the selected one of the set of concentrated image elements on the photoprocessed element.

32. A method for forming an output image from a photoprocessed element having an image area with at least two images recorded thereon in the form of concentrated image elements, the method comprising the steps of:

scanning the photoprocessed element to obtain image data from at least one pattern concentrated image element;

separating the image data obtained from concentrated image elements associated with a selected one of the patterns from image data associated with other patterns; and forming an output image based upon image data from the image data associated with the selected one of the patterns.

33. The method of claim 32, wherein the step of separating the image data from concentrated image elements associated with a selected one of the patterns from image data associated with other patterns comprises optically adjusting light modulated by the photoprocessed element during the scanning step so that during scanning only an image is scanned based upon only light modulated by the selected one of the pattern of concentrated image elements.

34. The method of claim 32, wherein the step of separating the image data from concentrated image elements associated with a selected one of the patterns from image data associated with other patterns comprises analyzing scanned image data having image information from more than one pattern of concentrated image elements to identify image elements from the selected pattern of concentrated image elements.

35. The method of claim 32, further comprising the step of providing a camera capable of recording at least two images on a photosensitive element in the form of concentrated image elements, receiving the provided camera, extracting the photosensitive element from the camera, and photoprocessing the extracted photosensitive element to form the photoprocessed element.

36. The method of claim 32, further comprising the step of providing the output image to a customer.

* * * * *